US008731373B2

(12) United States Patent
Gerbasi, III

(10) Patent No.: US 8,731,373 B2
(45) Date of Patent: May 20, 2014

(54) MANAGING AND EDITING STORED MEDIA ASSETS

(75) Inventor: Ronald A. Gerbasi, III, Studio City, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 871 days.

(21) Appl. No.: 12/495,680

(22) Filed: Jun. 30, 2009
(Under 37 CFR 1.47)

(65) Prior Publication Data

US 2010/0332560 A1 Dec. 30, 2010

(51) Int. Cl.
*H04N 5/93* (2006.01)

(52) U.S. Cl.
USPC .......................................................... 386/278

(58) Field of Classification Search
USPC .................................. 386/239, 248, 278, 281
See application file for complete search history.

(56) References Cited

U.S. PATENT DOCUMENTS

| | | | |
|---|---|---|---|
| 6,154,600 | A | 11/2000 | Newman et al. |
| 6,324,335 | B1 | 11/2001 | Kanda |
| 6,449,608 | B1 | 9/2002 | Morita et al. |
| 6,658,194 | B1 * | 12/2003 | Omori ........................... 386/284 |
| 6,944,226 | B1 | 9/2005 | Lin et al. |
| 7,362,946 | B1 * | 4/2008 | Kowald .......................... 386/278 |
| 2001/0003554 | A1 | 6/2001 | Mori et al. |
| 2002/0092021 | A1 | 7/2002 | Yap et al. |
| 2002/0174430 | A1 | 11/2002 | Ellis et al. |
| 2003/0149980 | A1 | 8/2003 | Hassell et al. |
| 2003/0154477 | A1 | 8/2003 | Hassell et al. |
| 2003/0154478 | A1 | 8/2003 | Hassell et al. |
| 2004/0091234 | A1 * | 5/2004 | Delorme et al. ................. 386/46 |
| 2004/0128685 | A1 | 7/2004 | Hassell et al. |
| 2004/0175159 | A1 * | 9/2004 | Oetzel et al. ................... 386/125 |
| 2005/0031304 | A1 | 2/2005 | Ishii |
| 2005/0091271 | A1 | 4/2005 | Srinivas et al. |
| 2005/0278771 | A1 | 12/2005 | Hassell et al. |
| 2005/0280651 | A1 | 12/2005 | Geddes |
| 2006/0083484 | A1 * | 4/2006 | Wada et al. ..................... 386/83 |

(Continued)

FOREIGN PATENT DOCUMENTS

| | | |
|---|---|---|
| WO | WO-00/39997 A2 | 7/2000 |
| WO | WO-01/63911 | 8/2001 |

OTHER PUBLICATIONS

Nero AG: "Nero 9: Manual Nero Vision," Im Stockmaedle 13, 76307 Karlsbad, Germany vol. Release 6.4.9.0 (Sep. 29, 2008), XP002606396. Retrieved from the Internet: URL:http://ftp6.nero.com/user_guides/nero9/vision/ [retrieved on 2010-10-12] Sect. 5.5, 6.1.3, 6.2, 8.2.

(Continued)

*Primary Examiner* — Tat Chio
(74) *Attorney, Agent, or Firm* — Ropes & Gray LLP

(57) ABSTRACT

Methods and systems are described for providing editing tools that allow a user to manipulate media provided by a media content source. Media editing tools may include content analysis tools capable of extracting information from the media content itself, and may include segment identification and editing tools. Editing tools may be created by a user, and stored or shared with other users. Users may be able to specify and customize a set of storage space requirements that impose constraints on the type, quantity and content of stored assets. Automatic storage management tools provide tools with which stored and to-be-stored assets may be transformed in order to maintain satisfaction of storage preferences and requirements.

48 Claims, 14 Drawing Sheets

(56) References Cited

U.S. PATENT DOCUMENTS

| | | |
|---|---|---|
| 2006/0184538 A1 | 8/2006 | Randall et al. |
| 2007/0033615 A1 | 2/2007 | Hassell et al. |
| 2007/0174774 A1 | 7/2007 | Lerman et al. |
| 2008/0089671 A1 | 4/2008 | Lang et al. |
| 2008/0187280 A1 | 8/2008 | Hassell et al. |
| 2008/0189745 A1 | 8/2008 | Hassell et al. |
| 2009/0164904 A1 | 6/2009 | Horowitz et al. |

OTHER PUBLICATIONS

Partial International Search Report issued Nov. 11, 2010 for PCT/US2010/039061.

International Preliminary Report on Pateentability dated Jan. 12, 2012 in International Application No. PCT/US2010/039061.

International Search Report and Written Opinion issued Apr. 11, 2011 for PCT/US2010/039061.

* cited by examiner

MANAGING AND EDITING STORED MEDIA ASSETS

BACKGROUND OF THE INVENTION

Media storage systems provide users with the ability to record media assets to a storage unit for future access. Such systems allow users, for example, to record a broadcast television program to a memory device for viewing at a later date, often with additional playback capabilities such as pause, rewind and fast forward. The convenience and capabilities of stored media assets make media storage an especially desirable feature of many media delivery systems.

However, users of such systems are often limited by the amount of available storage space for recorded media assets. Once a storage device reaches its storage capacity, previously stored assets must be deleted in order to make room for new recordings. Some users may have the opportunity to purchase additional storage space, either through augmenting and/or replacing local storage units or purchasing space on a remote storage device. Such opportunities are not available to all media storage system users, and may come at significant cost.

SUMMARY OF THE INVENTION

Consequently, there is a need for stored media asset management and editing tools that allow a user to adjust the recording and storage instructions for a media asset to minimize the amount of storage space required while preserving the features and content of the media assets most important to the user.

Such tools address the need for improved navigation and playback of stored media assets by facilitating the editing of stored assets. In particular, such tools provide editing capabilities that allow a user to manipulate media provided by a media content source. Media editing tools may include content analysis tools capable of extracting information from the media content itself, and may include segment identification and editing tools. Editing tools may be created by a user, and stored or shared with other users. Users may be able to specify and customize a set of storage space requirements that impose constraints on the type, quantity and content of stored assets. Automatic storage management tools provide techniques by which stored and to-be-stored assets may be transformed in order to maintain satisfaction of storage preferences and requirements.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
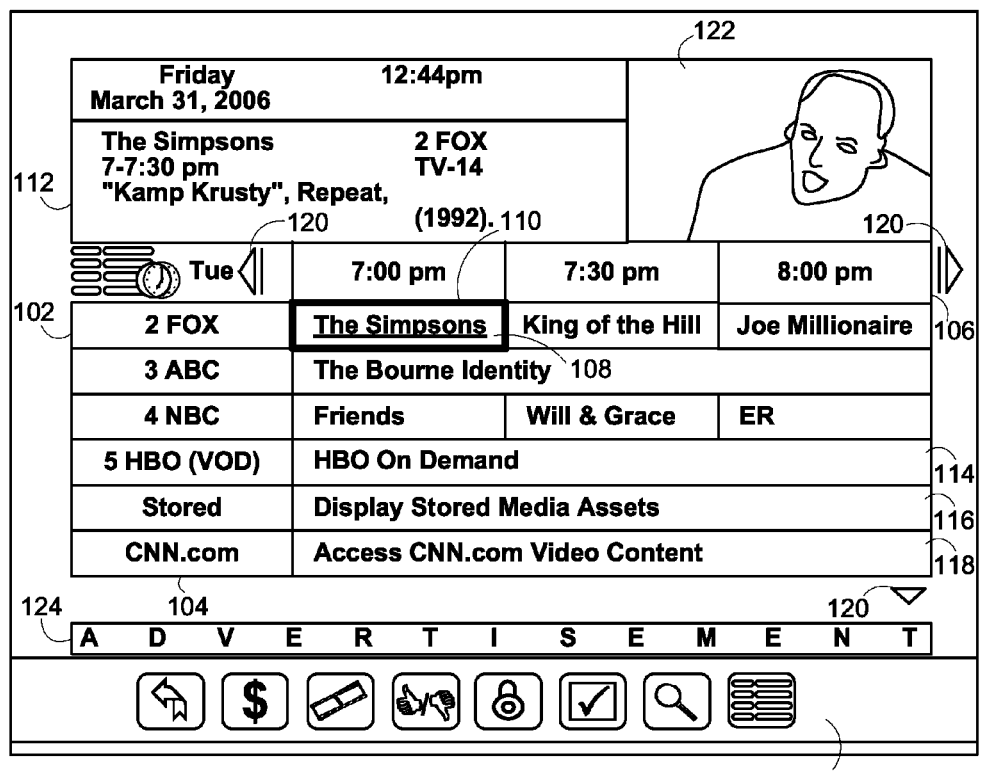
FIGS. 1 and 2 depict illustrative display screens that may be used to provide media guidance application listings.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, webcasts, etc.), and other types of media or video content. Guidance applications allow users to navigate among and locate content related to the video content including, for example, video clips, articles, advertisements, chat sessions, games, etc. Guidance applications allow users to navigate among and locate multimedia content, as well as edit and store such content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can be part of a live performance. It should be understood that the invention embodiments that are discussed in relation to media content are applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. Such media guidance applications may include media storage management and media editing applications, which are discussed further below. The various devices and platforms that may implement media guidance applications are described in more detail below.

One of the functions of the media guidance application is to provide media listings and media information to users. FIGS. 1-2, 6 and 8 show illustrative display screens that may be used to provide media guidance, and in particular media listings. The display screens shown in FIGS. 1-2, 6 and 8 may be implemented on any suitable device or platform. While the displays of FIGS. 1-2, 6 and 8 are illustrated as full screen displays, they may be fully or partially overlaid over media content being displayed. A user may indicate a desire to access media information or media editing applications by selecting a selectable option provided in a display screen (e.g., a menu option, a listings option, an icon, a hyperlink, etc.) or pressing a dedicated button (e.g., a GUIDE or a STORE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), storage information (e.g., date stored, or playlist order) or other predefined, user-defined, or other organization criteria.

FIG. 1 shows illustrative grid program listings display 100 arranged by time and channel that enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), remotely-stored media content (e.g., video content stored on a remote device such as a web server, a remote hard drive, or a networked hard drive), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Figure 6:
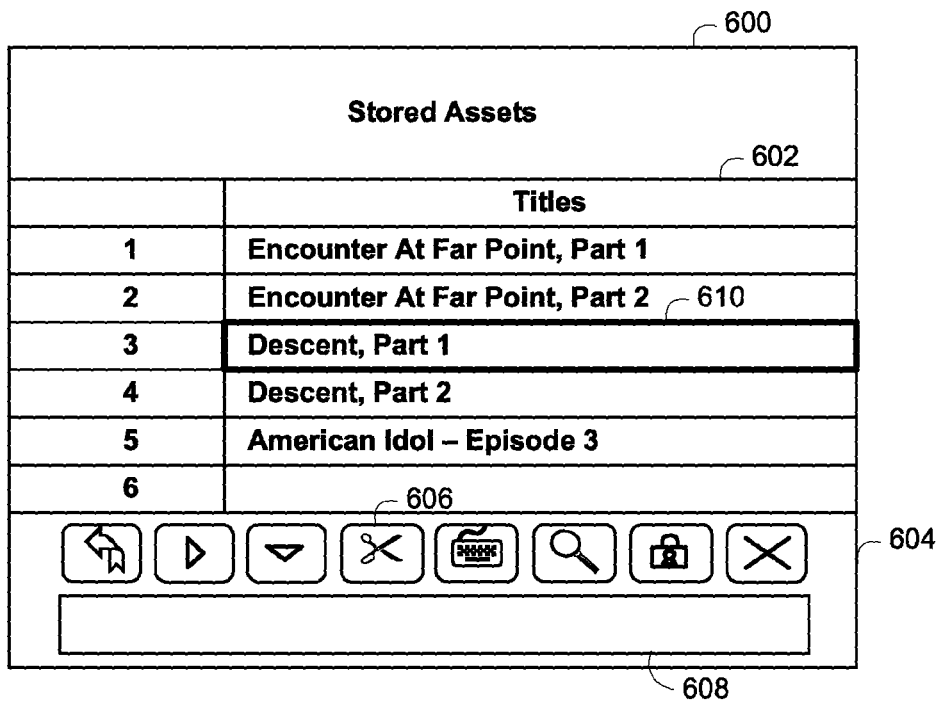
FIG. 6 depicts an illustrative stored assets display screen.
Figure 8:
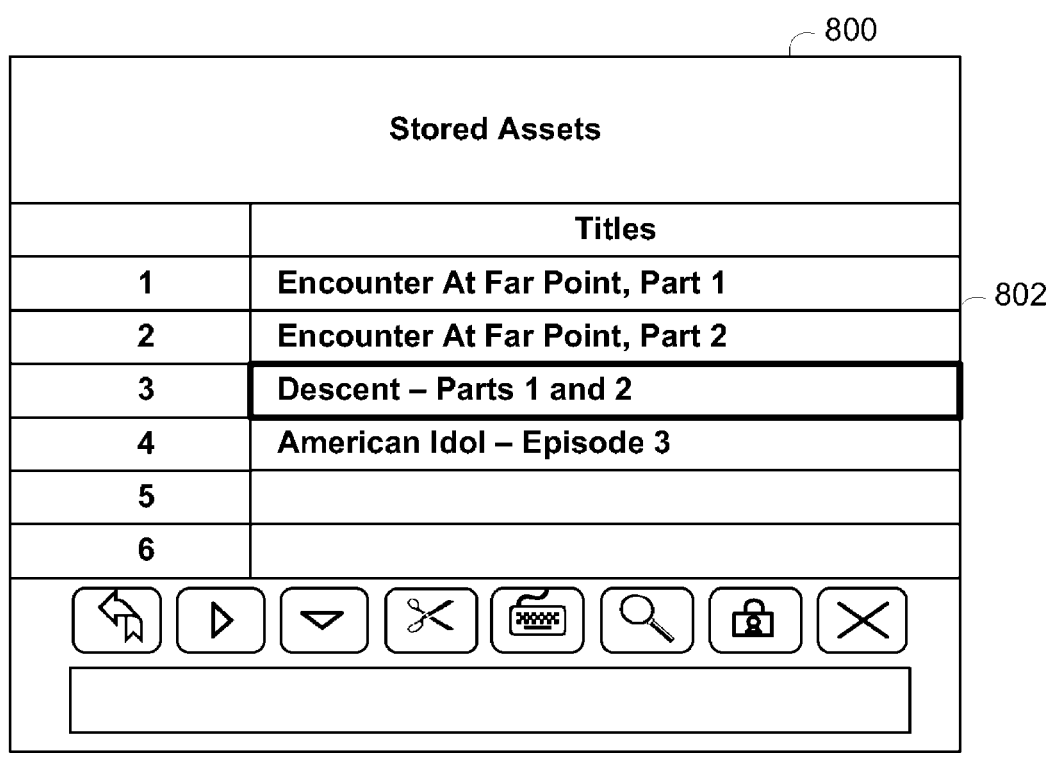
FIG. 8 depicts an illustrative stored assets display screen.

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, stored media assets, or Internet listings, respectively. In other embodiments, listings for these media types may be included directly in grid 102. Additional exemplary displays of stored media assets are depicted in FIGS. 6 and 8. Additional listings may be displayed in response to the user selecting one of the navigational icons 120. (Pressing an arrow key on a user input device may affect the display in a similar manner as selecting navigational icons 120.)

Display 100 may include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, media editing application displays, media storage application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, viewing and configuring editing and storage tools related to a program, setting program and/or channel as a favorite, purchasing a program, or other features. Options available from a main menu display may include search options, VOD options, parental control options, access to various types of listing displays, subscribe to a premium service, edit a user's profile or media asset storage preferences, review of available editing tools, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, editing tools, storage preferences, etc.), parental control settings, and other desired customizations.

The media guidance application may allow a user to provide user profile information or may automatically compile user profile information, including media recording, editing and storage preferences. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Figure 2:
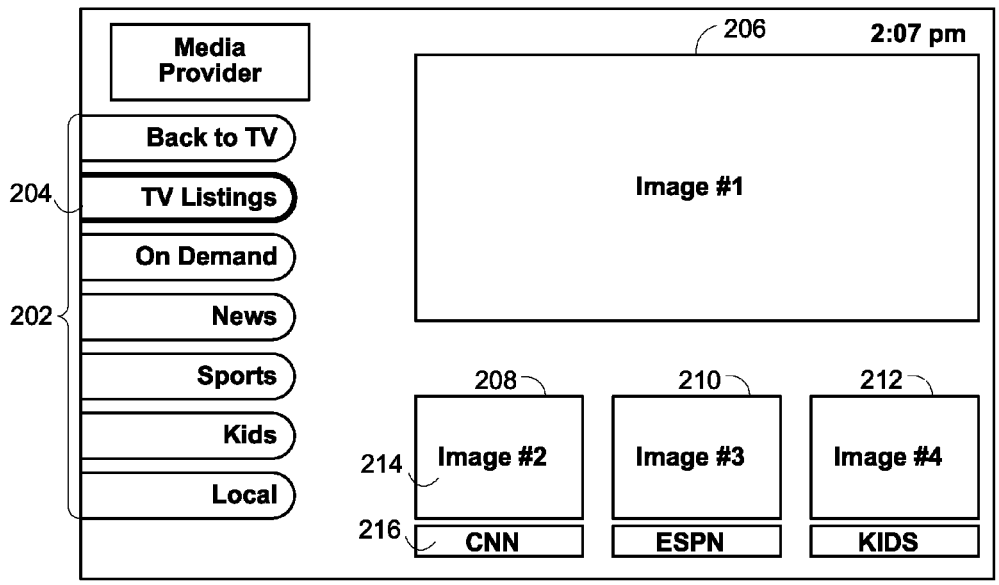

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
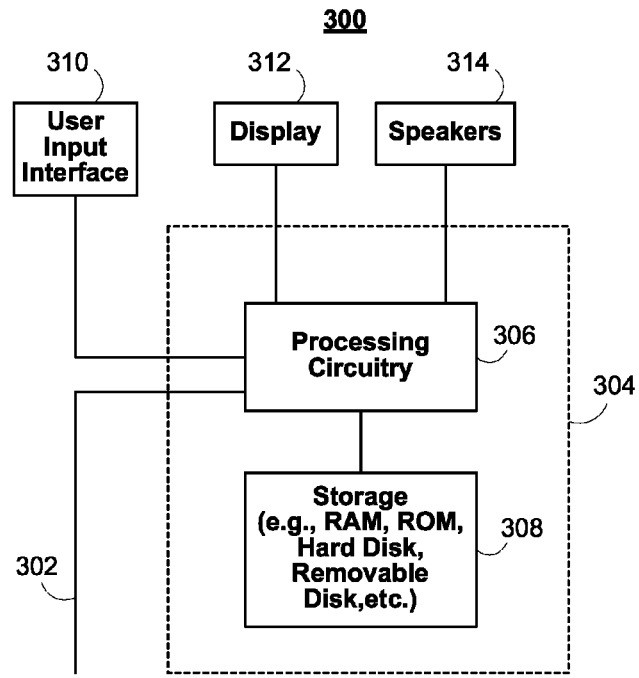
FIG. 3 depicts an illustrative user equipment device.

Users may access media content and media guidance applications (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In an embodiment, control circuitry 304 executes instructions for a media guidance application stored in memory (i.e., storage 308). In client-server based embodiments, control circuitry 304 may include communications circuitry suitable for communicating with a guidance application server or other networks or servers. Such servers may provide, for example, remote storage of users' recorded media content as an alternative or supplement to storage 308. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below). Peer-to-peer communication may enable a user to view media assets stored on a first user equipment device from a second user equipment device. Peer-to-peer communication may allow editing tools to be shared between multiple user equipment devices.

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein, including guidance application data, including program information, guidance application settings, user preferences or profile information; media storage and media editing tools and preferences; or other data used in operating the guidance application. Nonvolatile memory may be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may be provided. Control circuitry 304 may include scaler circuitry for upconverting and downconverting media into the preferred output format of the user equipment 300. Such circuitry may be employed by a media editing application, as further described below. Circuitry 304 may include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In an embodiment, display 312 may be HDTV-capable. Speakers 314 may be provided as integrated with other elements of user equipment device 300 or may be stand-alone units. The audio component of videos and other media content displayed on display 312 may be played through speakers 314. In an embodiment, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In other embodiments, the media guidance application is downloaded and interpreted or otherwise run by an interpreter or virtual machine (run by control circuitry 304). In an embodiment, the guidance application, including media editing tools, may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
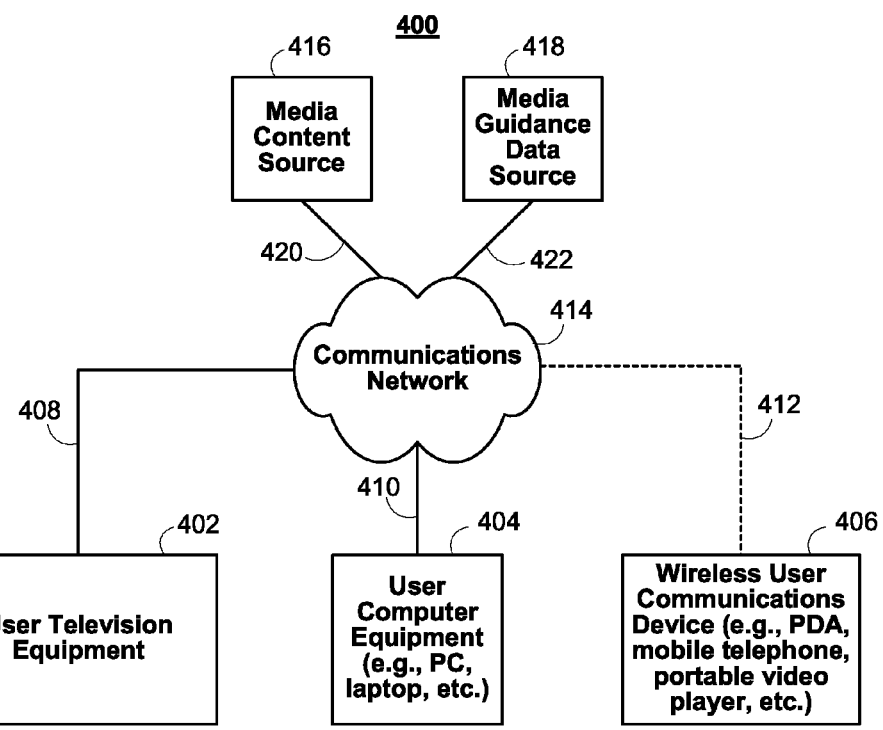
FIG. 4 is a simplified diagram of an illustrative interactive media system.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and more than one of each type of user equipment device (e.g., a user may have a PDA and a mobile telephone and/or multiple television sets).

The user may set various settings to maintain consistent media guidance application settings across in-home devices and remote devices. Settings include those described herein, as well as channel and program favorites, programming preferences that the guidance application utilizes to make programming recommendations, display preferences, media asset storage and editing settings, and other desirable settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications networks or combinations of communications networks. BLACKBERRY is a service mark owned by Research In Motion Limited Corp. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in an embodiment, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance data may include data useful for media editing applications run on user equipment. Such data may, for example, indicate the start and end points of segments within a program and/or provide information about the content of the segments. For example, media guidance data source 418 may provide start times and durations for the segments of a game show which feature a particular participant, as well as provide information regarding the identity of the participant and the content of the segment. Media guidance and/or media editing applications may display this data to a user to allow him or her to tailor his or her viewing experience or provide editing instructions for program segments to be stored.

Media guidance application data may be provided to the user equipment devices using any suitable approach. In an embodiment, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may transmit data for storage on the user equipment, which then generates the guidance application displays based on instructions processed by control circuitry.

Media guidance data source 418 may make editing tools available to users for use with stored media assets. Such tools may be downloaded from media guidance data source 418 to a user equipment device, or may be accessed remotely by a user. These editing tools, as well as other applications and features, may be provided to users on a subscription basis or may be selectively downloaded or used for an additional fee. In an embodiment, media guidance data source 418 may serve as a repository for editing and stored asset management tools developed by users and/or third-parties, and as a distribution source for these tools.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 402 and user computer equipment 404 may access the media guidance application to navigate among and locate desirable media content. Users may access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

Figure 5:
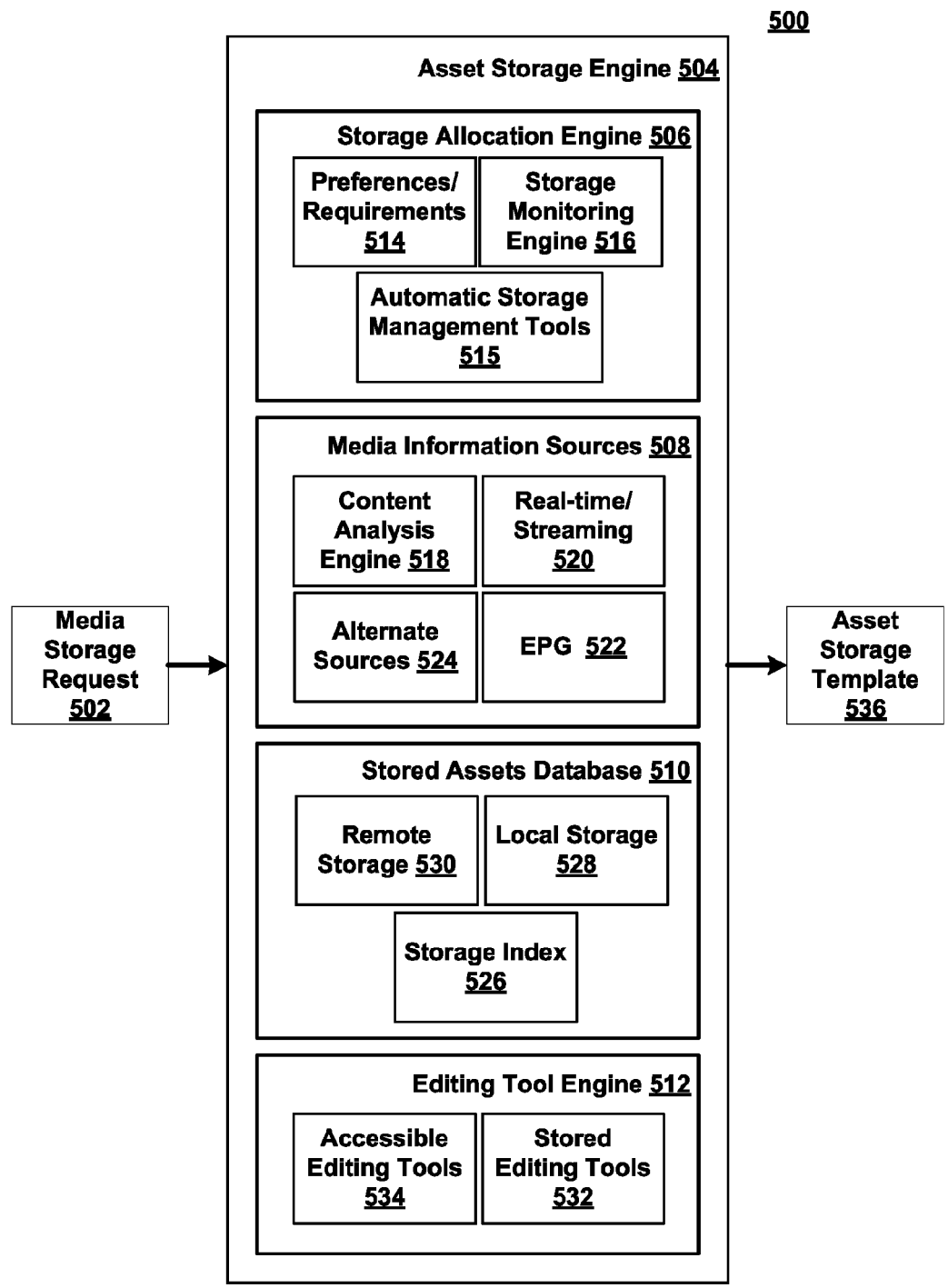
FIG. 5 is a block diagram of an illustrative asset storage management system.

FIG. 5 is a block diagram of illustrative asset storage management system 500. As described above, asset storage management systems may be used to manage storage space used for recorded media assets and improve the navigation and playback of stored assets. Media storage request 502 is issued to asset storage engine (ASE) 504. Media storage request 502 may be the result of an explicit user input (e.g., the pressing of a sequence of keys on a remote control while a screen such as FIG. 1 is displayed), or may be issued automatically by the user equipment as part of a scheduled or pre-defined recording routine. ASE 504 may contain storage allocation engine 506, media information sources 508, stored assets database 510 and editing tool engine 512.

Storage allocation engine 506 maintains storage preferences and requirements 514 of the available storage devices. For example, preferences and requirements 514 may specify that the maximum capacity of a local magnetic hard drive is 50 GB, that the user prefers no more than 20% of storage be used by media content classified in the "hip-hop music video" category, and that content not viewed within the previous month be deleted. Preferences and requirements 514 may be set by a user, for example, via options region 126 of the display of FIG. 1, or may be configured through another user input mechanism. Alternatively, preferences and requirements 514 may be imposed by user equipment or by the media delivery system (e.g., as part of a subscription agreement). Automatic storage management tools 515 provide techniques by which the stored and to-be-stored assets may be transformed in order to maintain satisfaction of preferences and requirements 514, and are discussed in detail below. Storage monitoring engine 516 maintains information related to the current and past usage of the storage space (e.g., 16 GB are currently free on a local hard drive, and the peak past usage of a remote storage device was 9 GB).

Upon receipt of media storage request 502, asset storage engine 504 retrieves information from media information sources 508. Media information sources 508 provide information regarding the media that is the subject of media storage request 502, which may include, for example, identification information (e.g., media type identifiers 104 and time identifiers 106), listing information, content information, segment start and end times, as well as any other information associated with the requested media. Media information sources 508 may provide any information to supplement the content of the requested media, including pointers to related content, associated electronic applications, advertisements for related products and services, as well as storage and access constraints (e.g., parental controls and/or expiration dates). Media information sources 508 may include components similar to those of media guidance data source 418, as described above.

In particular, media information sources 508 may include content analysis engine 518 which may be capable of extracting information from the media content itself. Content analysis engine 518 may reside on local user equipment, or may be executed on a remote processor and its results communicated to local user equipment via I/O 302. Content analysis engine 518 may perform any of the following functions: detect segments within the requested media (e.g., identify commercials within a media event), distinguish different rounds of a game show, distinguish different songs from a streaming audio source, separate the opening sequence and credits from the rest of a television program); audio and/or video feature extraction (e.g., classifying a program in the "nature" genre based on video content, identifying songs featured in a broadcast movie by analysis of an audio component); and content matching (e.g., determining that two television programs are different episodes of a same series based on comparison of the opening/closing sequences or featured actors).

Content analysis engine 518 may be personalized for the preferences and viewing patterns of a user, as described above with reference to media guidance applications. Content analysis engine 518 may perform its functions based purely on the content of the media of the storage request (e.g., by performing a principal components analysis or other suitable statistical technique on selected features of the media, and/or comparing selected features of the media to a lookup table of content markers), and may supplement the content analysis with information provided by another of media information sources 508.

Media information sources 508 may include real-time/streaming information 520 provided to the user equipment. As described with reference to media guidance data source 418, real-time/streaming information 520 may be provided by any suitable data transmission technique (e.g., over communications network 414), including embedding information in a digital signal transmitted in-band or out-of-band. For example, closed caption information may be provided alongside both analog and digital television signals. Another example of a system for embedding information into graphic content is described in Yuen U.S. Pat. No. 6,859,799, issued Feb. 22, 2005, which is hereby incorporated by reference herein in its entirety.

Media information may be provided through electronic program guide (EPG) 522, which may provide the linear and non-linear programming information discussed in detail above (e.g., with reference to illustrative grid program listings display 100 of FIG. 1). EPG 522 may store program information which can be utilized by asset storage engine 504.

In an embodiment, media information sources 508 include alternative information sources 524. Alternative information sources 524 may include user-supplied information (such as personal ratings, genre classification or membership in a personal playlist), periodically-supplied information (such as weekly movie reviews downloaded from a web site) or information extracted from physical storage media (such as DVDs or Flash memory devices). Additionally, media information may be integrated from data provided by any of user television equipment 402, user computer equipment 404 and user wireless communication device 406.

In an embodiment, ASE 504 includes stored assets database 510. Stored assets database 510 may include storage index 526 which catalogs all of the currently stored media assets located in local storage 528 and/or remote storage 530. These stored media assets may be based on the content provided by media content source 416, and may include an edited program generated in accordance with asset storage template 536 provided by asset storage engine 504 as described below. Stored assets database 510 may include information provided by any of media information sources 508, and may provide information regarding stored assets to other components of asset storage engine 504, such as content analysis engine 518.

Asset storage engine 504 may include editing tool engine 512, which provides editing capabilities that allow a user to manipulate media provided by media content source 416 (FIG. 4) to be stored as a media asset. Editing tool engine 512 may have several sources of editing transformations that can be invoked by asset storage engine 504, including stored editing tools 532 and accessible editing tools 534. Stored editing tools 532 may include those stored on local user equipment or in a remote storage. Accessible editing tools 534 are those that are available to a user under restricted conditions, such as requiring a fee or membership. An editing tool may be pre-defined and supplied by the media delivery system provider, or may be created and stored by users. Parameters and preferences for editing tool engine 512 may be set by a user via options region 126 or by any suitable user interface. Many embodiments of editing tools in accordance with the invention are discussed in detail below.

In response to media storage request 502, ASE 504 provides asset storage template 536. Asset storage template 536 includes a set of storage instructions for the media to be stored. These instructions are produced at the conclusion of the execution of storage allocation engine 506 and editing tool engine 512 with input from media information sources 508 and stored assets database 510. For example, asset storage template 536 may include instructions to store portions of an episode of the television program "American Idol" in which Kelly Clarkson is the featured participant, as a result of the execution of a "clipping" editing tool based on identified segments of the program which feature Kelly Clarkson.

The creation of asset storage template 536 will now be discussed with reference to FIGS. 6-15. FIGS. 6-12 depict examples of display screens that illustrate some of the media and editing storage features of the invention. However, it is understood that these and other features of the invention may be embodied in any appropriate user interface or display.

FIG. 6 depicts illustrative stored assets display screen 600 in accordance with an embodiment of the invention. Stored assets display screen 600 includes a list of stored media assets 602 and navigation/options area 604. The media assets of list 602 may be all or a subset of those assets catalogued in stored assets database 510, and may be displayed in any convenient manner (e.g., by title, date of recording, or in a user-specified order). Stored media assets list 602 may include media items scheduled for future recording, and may display those items in list 602 in a distinguishing manner (e.g., with an italicized title). Stored media assets list 602 may be filtered and sorted according to user instructions. The media assets displayed in list 602 may be selectable. Navigation/options area 604 may contain selectable icons that allow a user to navigate to different parts of the media guidance application, including editing tool icon 606. Navigation/options area 604 may include information region 608 for displaying advertisements, details of selected media assets, news headlines, or any other information.

In FIG. 6, stored media asset 610, entitled "Descent, Part I", has been selected (e.g., via user input interface 310). After selecting one or more stored media assets, a user may launch a media editing tool display screen by, for example, selecting editing tool icon 606. A media editing tool display screen may be launched prior to selecting a stored media asset. In this scenario, once launched, the media editing tool display screen may prompt the user to select media assets for editing. In an embodiment, an editing tool as described herein can be applied to media items that have not yet been stored but are scheduled for future recording.

Figure 7A:
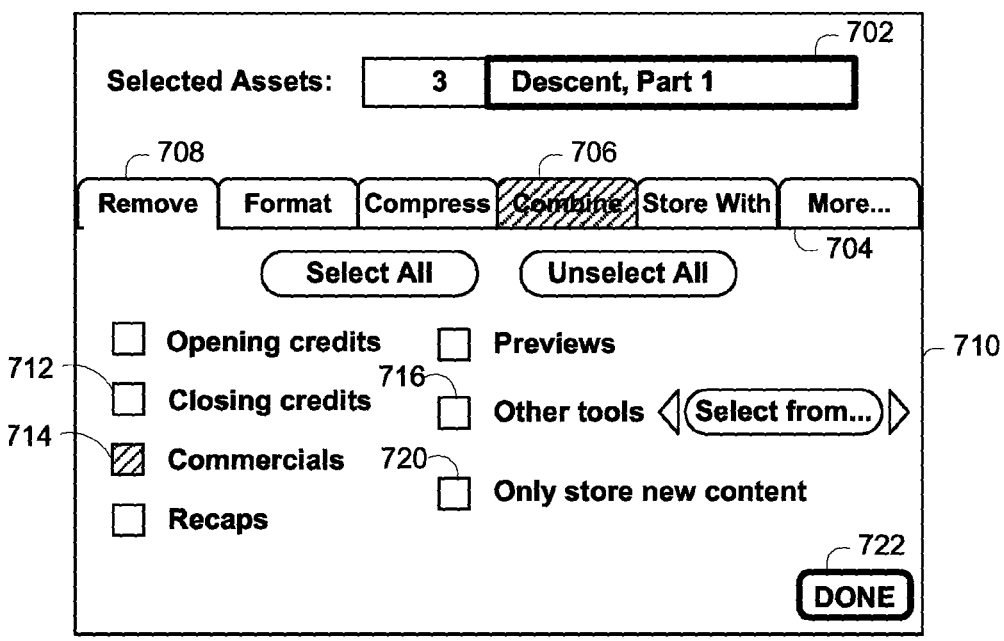
FIGS. 7A-7E depict illustrative media editing tool display screens.

FIGS. 7A-7E depict illustrative media editing tool display screens in accordance with embodiments of the invention. Media editing tool display screen 700 includes selected asset display region 702, which lists the assets currently selected for editing. Editing tool tab region 704 provides different categories of editing tools that may be applied to the currently selected assets. In an embodiment, only some of the categories of editing tools may be applied to the currently selected assets. For example, FIG. 7A depicts tab 706 labeled "Combine" as shaded to indicate that its editing options may not be applied to the media assets listed in selected asset display region 702. The editing tools available to a user may depend on a factor or factors such as the applicability of the editing tool to the selected media asset, the availability of the information required by the editing tool, the capabilities of the equipment performing the editing operations, requirements imposed by a provider or source of the selected media assets, access restrictions based on a service contract, and/or user-specified controls (e.g., parental controls).

Editing tool tab region 704 may indicate a currently selected editing tool tab, which is tab 708 labeled "Remove" in FIG. 7A. When tab 708 is currently selected, editing tools associated with the "Remove" category of editing tools will be displayed for the user in editing tools display region 710.

A number of editing tools associated with the "Remove" category are depicted in FIG. 7A. In an embodiment, a user is able to select one or more portions of the selected assets that are designated for removal before storing. By checking closing credits box 712, for example, the user may indicate that closing credits included in the selected assets are designated for removal from the selected media assets if they are already stored, or are not to be stored when the selected media assets are scheduled to be recorded in the future. In an embodiment, an editing tool is provided that removes commercials from the selected media asset when stored. When a user selects such a commercial removal tool, segments of the selected media assets which are identified as commercials are distinguished from non-commercial segments, and only the non-commercial segments are retained when the selected assets are stored.

In an embodiment, a removal tool may be accompanied by a default transition option or may allow a user to specify the transition to use in place of the removed segment. For example, rather than having a "hard cut" between the portions of a program immediately preceding and following a removed commercial, a commercial removal tool may include a fade or other transition. Transition options are discussed in additional detail below with reference to FIG. 7E.

In an embodiment, not all types of asset portions may be available to be removed from every selected media asset. For example, in FIG. 7A, a commercial removal tool as described above is depicted as "unavailable" by the shading of commercial removal box 714. The availability of certain editing tools or categories of editing tools may be determined by constraints on the editing options available for the selected media assets, or may be imposed by the media delivery system. For example, sponsors of a streaming radio program may not wish to have commercials removed from their program when stored, and thus may request that this tool be disabled when the program is edited. Other types of asset portions that may be removed by an editing tool include opening credits, closing credits, recap sequences, and preview sequences.

The display of FIG. 7A includes an option for a user to select "Other tools" for removing portions of the selected assets by checking other tools box 716. Such other tools may be provided and stored as described above with reference to editing tool engine 512 (FIG. 5). In an embodiment, a user may be given the option to only store portions of the selected assets that are not already stored. For example, if new content box 720 is selected, editing tool engine 512 will compare the selected assets against stored assets database 510 to determine if any content is repeated. If there is repeated content (e.g., an episode of a television series has already been stored, or an image has already been stored), only the non-repeated content of the selected assets will be stored.

When a user has completed selecting or defining all of the desired editing tools in the "Removal" category, he or she may select another editing tool category from editing tool tab region 704. If no additional categories are of interest, the user may indicate that he or she is finished with customizing the editing tools to be applied to the selected assets (e.g., by selecting "Done" button 722 or pressing a dedicated key on a user input device).

Figure 7B:
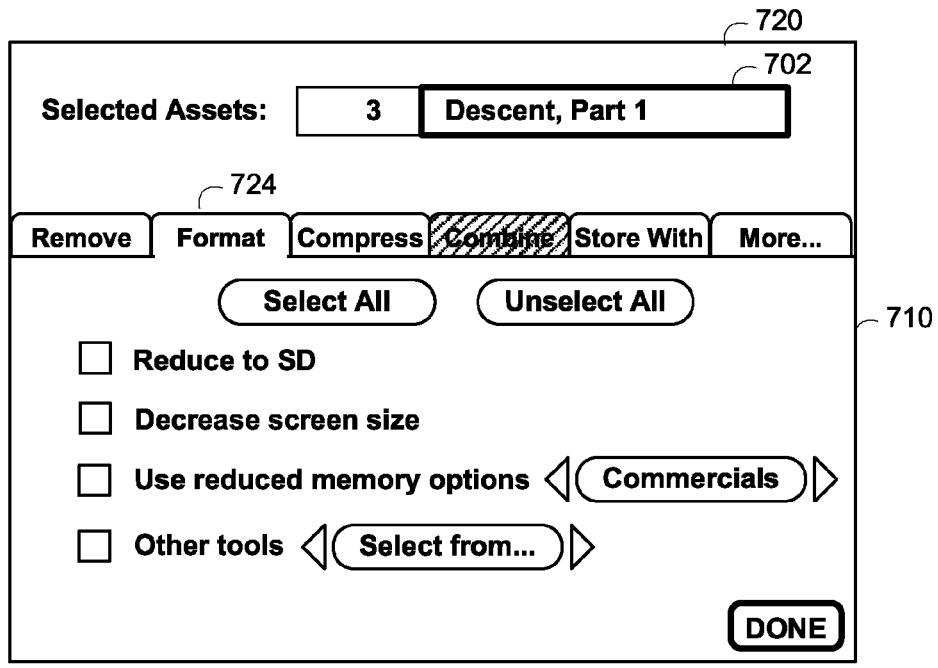

FIG. 7B depicts illustrative media editing tool display screen 720 in which tab 724 labeled "Format" is the currently selected editing tool tab. In FIG. 7B, editing tools associated with the "Format" category are displayed in editing tools display region 710. In an embodiment, a user may select one or more editing tools that adjust the format properties of the selected assets displayed in selected asset display region 702. An editing tool may allow a user to downsample an HD program and store a corresponding SD media asset, thereby reducing the storage space required. Editing tools may be provided that decrease the screen size of any selected video assets or resolution (temporal and/or spatial) of the selected assets.

Additionally, display screen 720 may include editing tools that replace portions of the selected assets with corresponding reduced memory portions. For example, an editing tool may replace a video commercial with a still image advertisement in the stored asset. Alternatively, a video commercial may be replaced by a text-only advertisement. These reduced memory portions may be included in the edited assets as an overlay or included in a portion of the display screen during playback of the stored edited asset. As illustrated in FIG. 7B, a user may be able to select more than one such editing tool to apply to the selected assets.

Figure 7C:
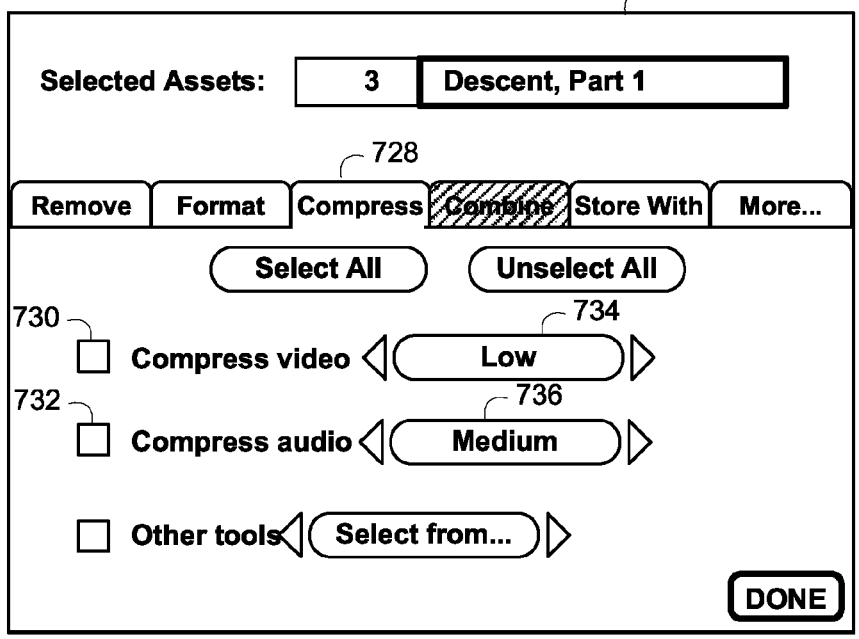

FIG. 7C depicts illustrative media editing tool display screen 726 in which tab 728 labeled "Compress" is the currently selected editing tool tab. In an embodiment, a user may select one or more editing tools that adjust the compression properties of the selected assets, either prior to or after storage. Such editing tools may allow a user to compress the video and/or audio portions of the selected assets. In FIG. 7C, a user may select video and audio compression tools by selecting boxes 730 and 732, respectively. Menus 734 and 736 may each provide at least one compression option that can be applied to the selected assets. For example, menu 734 of FIG. 7C depicts the "low" compression option as currently selected, indicating that a low-compression scheme is to be employed. Compression schemes that may be provided by an editing tool include lossy and lossless compression schemes, interframe video compression, intraframe video compression, spatial redundancy reduction techniques, methods that employ separate format and correction techniques, time or frequency domain methods, constant and variable bitrate techniques, or any appropriate encoding method that reduces the quantity of data required to store the selected assets.

Figure 7D:
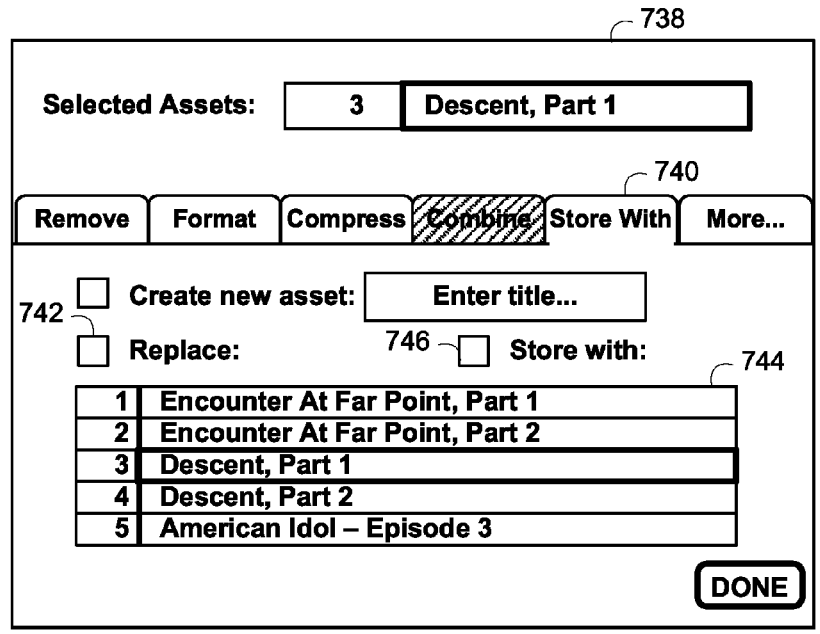

FIG. 7D depicts illustrative media editing tool display screen 738 in which tab 740 labeled "Store With" is the currently selected editing tool tab. In an embodiment, a user may select one or more editing tools that adjusts the storage location properties of the edited selected assets (i.e., the assets to be stored in accordance with the application of the desired editing tools to the selected assets).

Adjusting the storage location properties of the selected assets may include replacing a stored asset with a selected asset. Such an embodiment is illustrated in FIG. 7D, wherein a user can select box 742 to indicate a desire to replace one of the stored assets listed in stored asset listing area 744 with the edited selected assets. In the scenario depicted in FIG. 7D, the selected asset (i.e., "Descent, Part I") is the same as the stored selected asset in stored asset listing area 744, and applying the editing tool will result in replacing the existing stored selected asset with the edited selected asset. Additionally, more than one stored asset from stored asset listing area 744 may be selected to be replaced by the edited selected assets.

Adjusting the storage location properties of the selected assets may include storing a selected asset with a previously stored asset as a single stored asset. This feature is illustrated in FIG. 7D, wherein a user may select a stored asset from stored asset listing area 744 with which to store the edited selected asset. When storing two or more assets as a combined asset, the order of playback within the combined asset may be designated by the user or may be designated by the editing tool. In an embodiment, the user may choose to have playback of the single stored asset begin with the selected asset, followed by the previously stored asset, or in the reverse order. When storing multiple selected assets with a previously stored asset, the user may specify the sequence in which playback of the single stored asset should occur. In an embodiment, the editing tool may store a selected asset with a previously stored asset such that playback occurs according to default parameters, such as commencing playback with the asset recorded earliest, the asset with the earliest initial broadcast date, or the asset with the earliest production date. The user may be given the option of storing the edited selected asset as a new stored asset, and may provide a title and additional information associated with the new stored asset. Such an option may be the default mode of operation of the editing process, and may be presented separately to the user at the beginning or end of editing tool selection and customization.

Figure 7E:
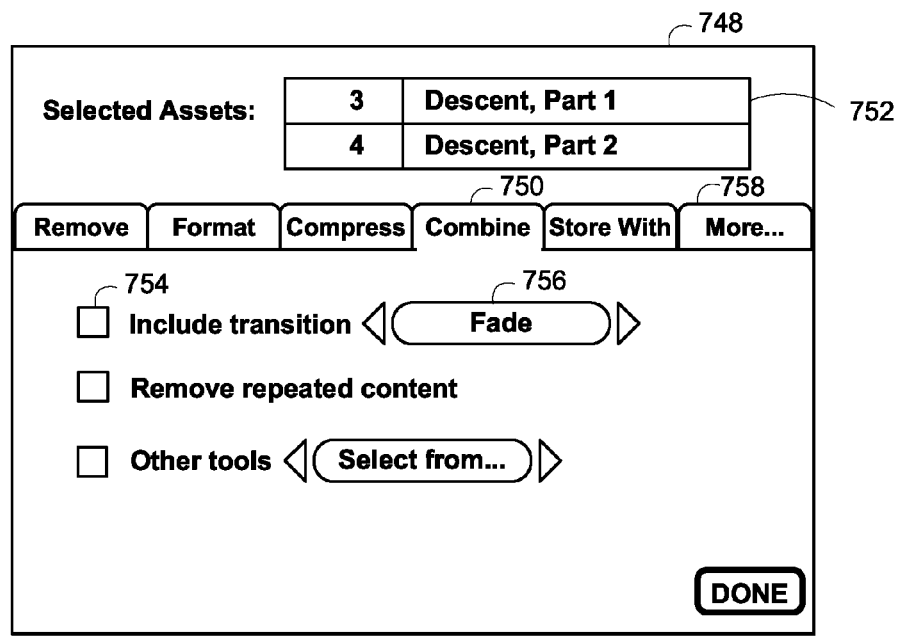

FIG. 7E depicts an illustrative media editing tool display screen 748 in which tab 750 labeled "Combine" is the currently selected editing tool tab. In an embodiment, when a user selects multiple assets for editing, a user may choose to apply one or more editing tools that combine the multiple selected assets into a single stored asset (stored in accordance with the other selected editing tools and options as described previously). In FIGS. 7A-7D, tab 750 was shaded to indicate that this set of editing tools was not available when a single asset is selected for editing. In FIG. 7E, two assets have been selected for editing, as displayed in selected asset display region 752.

In an embodiment, an editing tool is provided to include a transition between two media assets being stored as a single asset. In FIG. 7E, a user may select such an editing tool by selecting box 754 and choosing from among the choices presented in transition options menu 756. Transition options may include any A-B roll-type editing options. For video media, the transition options may include cut, crossfade, fades to and from a solid color, wipe, flip, blinds, checkerboard, cover, flyaways, splits, or any other. For audio media, the transition options may include fades and cross-fades, among other common audio transitions. The transitions available to the user, as well as any editing tool, may depend on equipment and performance limitations and requirements. For example, transition options may be excluded that may require unavailable computational resources, or may cause an inconvenient delay to the user.

In an embodiment, an editing tool may remove repeated content between the multiple selected assets. As described previously, the existence of repeated content may be determined by asset storage engine 504 querying stored assets database 510 (FIG. 5). Such an editing tool may only be presented when repeated content is present between the multiple selected assets.

Many of the editing features and options illustrated in FIG. 7E and described as falling within the "Combine" category of editing tools may be applied to two or more media assets. These features may be presented to a user under the "Store With" category. The organization of the editing tools and options described herein can be presented to a user in any appropriate manner, organization or via any appropriate user interface. The organization of these tools may depend on a user's preferences. For example, a separate editing tool tab "Popular Tools" may be provided that presents the most commonly used editing tools from across all categories, or those which the user has designated as favorite tools. When an editing tool is applied more than once (for example, when a user is storing several nature documentaries and applies the same editing tools to each documentary), a separate editing tool tab may be presented that includes only the relevant tools. In an embodiment, asset storage engine 504 may automatically populate a separate editing tool tab that displays frequently used editing tools.

FIG. 7E also displays a "More . . . " category of editing tools. Additional editing tools may be included in this category, or may be associated with any other suitable category. An editing tool may be included in more than one category, and additional categories may be displayed. In an embodiment, additional editing tools may be provided that allow a user to overlay text or graphics onto a media asset, or insert text or graphic segments at particular points within a media asset or assets. A user may choose to add any of a title screen, a closing screen, a transition screen, an overlay, and a caption. The textual or graphical content of an overlay or insertion may be provided by a user through user input interface 310 (e.g., by typing on a keypad or selecting alphanumeric characters from an display screen). The textual or graphical content of an overlay or insertion may be selected by the user from information and content provided by a media provider or stored in the system (e.g., adding a title screen with the title provided by media information sources 508, or inserting an overlay of a graphic image stored in stored assets database 510). For example, a user may wish to insert text relating the name and song selection of a contestant on a stored episode of "American Idol." This text may take any suitable form desired by the user, including an overlay during the contestant's performance, or may be displayed before or during a transition into the contestant's performance.

Other collections of editing tools may be assembled and displayed. In an embodiment, a collection of editing tools may be designated by the user (e.g., "My Nature Tools"). In an embodiment, an editing tool or collection of editing tools may be supplied by the media delivery system (e.g., as part of a subscription service or for a fee). In an embodiment, an editing tool or collection of editing tools may be generated or supplied by another user of the system (e.g., "Steven Spielberg's Editing Tools").

In an embodiment, the user may select at least one asset and customize at least one editing tool. The at least one asset may be stored in accordance with the customized at least one editing tool. Next, the user may indicate the completion of the editing process (e.g., by selecting the "Done" button 722 or by pressing a special key on a remote control). If the selected assets have already been stored, the asset storage engine 504 generates a set of storage instructions in asset storage template 536 as described above with reference to FIG. 5. A storage device such as storage 308 of FIG. 3 receives asset storage template 536 and stores the selected assets in accordance with asset storage template 536. The newly stored asset may then appear in a stored asset display screen. FIG. 8 depicts illustrative stored assets display screen 800 that may be displayed when a user selects "Done" button 722 in FIG. 7E. In stored asset display screen 800, the newly stored asset "Descent—Parts 1 and 2" is included in the list of stored media assets 802.

Figure 9A:
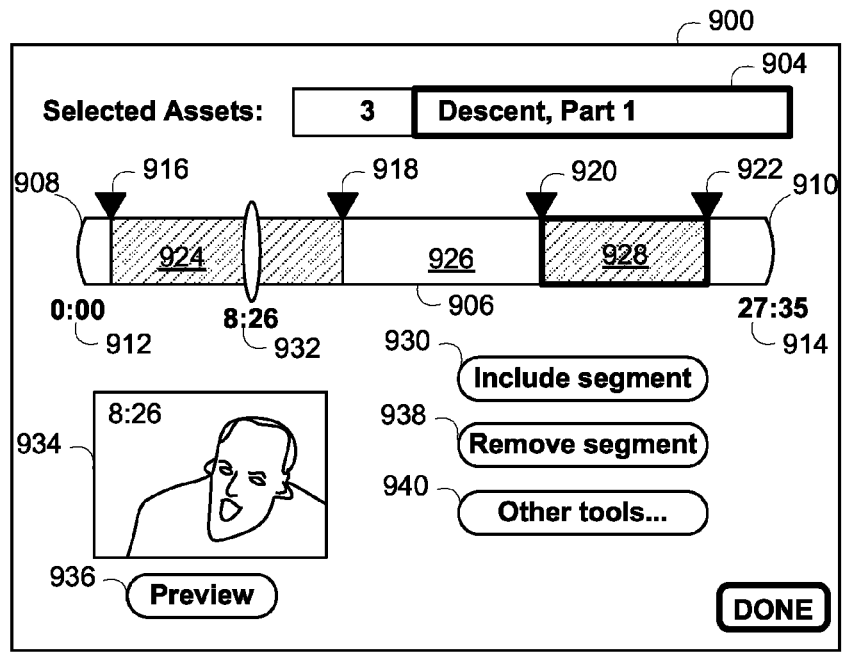
FIGS. 9A-9B depict illustrative segment identification and editing display screens.
Figure 9B:
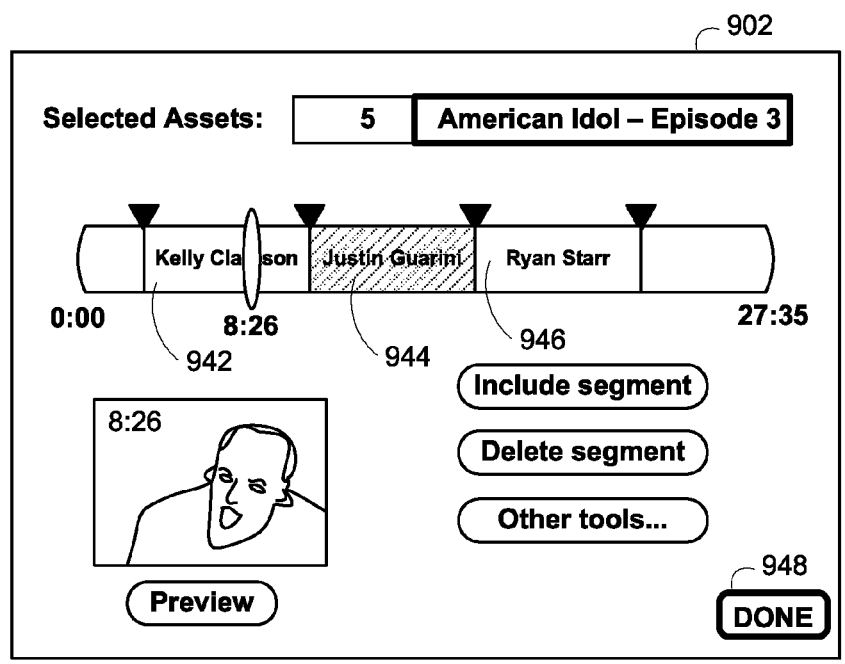

FIGS. 9A-9B depict illustrative segment identification and editing display screens in accordance with an embodiment of the invention. In an embodiment, users may interact directly with segments within the selected media assets (already stored and/or prior to storage). Features of such embodiments will be described with reference to illustrative display screens 900 and 902 of FIGS. 9A and 9B, respectively. In display screen 900, the title of a selected asset is displayed in title region 904 and a graphical depiction of the selected asset is displayed as asset timebar 906. Asset timebar 906 has first end 908 representing the start point of the selected asset and second end 910 representing the end point of the selected asset. The times corresponding to these start and end points are displayed in times 912 and 914, respectively.

Between first and second ends 908 and 910 of asset timebar 906 are segment markers 916, 918, 920 and 922. These segment markers represent stop and end points of segments within the selected asset. For example, segment marker 918 represents the end point of segment 924 and the start point of segment 926. Display screen 900 includes current time indicator 932 which identifies the point in the selected asset currently being displayed in preview window 934. If a user selects "Preview" button 936, the selected asset (as will be stored in accordance with the current set of editing tools as described below) is displayed for the user to review prior to storage.

As described above, a segment marker at a point in the selected asset may distinguish two portions of the selected asset (e.g., a commercial from a television program, a first song from a second song in a streaming audio broadcast, or a closing credits sequence from a main portion of a movie). These segment markers may be specified by a user or provided automatically (e.g., as discussed above with reference to media information sources 508 of FIG. 5 or below with reference to steps 1320-1326 of FIG. 13). For example, a user may specify segments by selecting points with a user input device in asset timebar 906. When a point is selected, a marker such as segment marker 918 is placed above asset timebar 906 at the selected point, and that point now serves as the end point and start point of the portion of the selected asset following immediately prior to and immediately after the selected point, respectively.

In an embodiment, one or more thumbnail views or snapshots of the selected asset may be displayed for the user. Such thumbnail views may assist a user in identifying portions of the asset that are of interest when generating segment markers. A thumbnail view screen may display an array of frames or short clips captured at one or more intervals in an asset (e.g., at five-minute intervals or any other suitable time interval). In an embodiment, the thumbnail views may correspond to previously-identified segments. For example, the thumbnail views may be single frames or short clips from the beginning of each of the identified segments. In an embodiment, a user may be able to identify segments for inclusion in a stored asset by indicating the corresponding thumbnail views. In an embodiment, selecting a thumbnail view may allow a user to play back a portion of an asset, which may be related to the thumbnail view.

In an embodiment, once segment markers have been generated, segments themselves may be selected and included in, excluded from, or subject to other editing for storage. For example, display screen 900 depicts selected segment 928. If a user selects "Include segment" button 930, selected segment 928 will be included in the selected asset when stored. If the user selects "Remove segment" button 938, selected segment 928 will not be included in the selected asset when stored. If "Other tools . . . " button 940 is selected, the user may be presented with an option to select additional editing tools that can be applied to selected segment 928. Such an option may take the form of the editing tool display screens illustrated in FIGS. 7A-7E, or a display of a subset of the editing tools available therein. For example, editing tool display screen 720 of FIG. 7B may be displayed when a user selects "Other tools . . . " button 940. If the user indicates that a reduced memory option is to be applied to a selected segment, a reduced memory portion may be included in the edited assets at the same start point as the selected segment occurs in the unedited assets.

The segments delineated by the segment markers may depend on the content of interest to a user. Each of the segments may be displayed along with a subset of the characteristics of the content of the segment. For example, one user may only care to distinguish commercial advertisements from television programs, while another user may care to distinguish between segments featuring different participants within a single television game show. An example of a display screen addressing the needs of the latter user is given by display screen 902 of FIG. 9B, in which the title of the selected asset is "American Idol—Episode 3" and segments 942, 944 and 946 are displayed along with the featured participants in each segment ("Kelly Clarkson," "Justin Guarini," and "Ryan Starr," respectively). Such a display screen allows a user to make editing decisions with improved speed and accuracy. The user may indicate that he or she is finished with selecting the editing tools to be applied to the selected asset by selecting "Done" button 948 or pressing a dedicated key on a user input device. FIGS. 9A-9B depict one selected asset, but more than one asset may be selected and edited simultaneously.

Figure 10A:
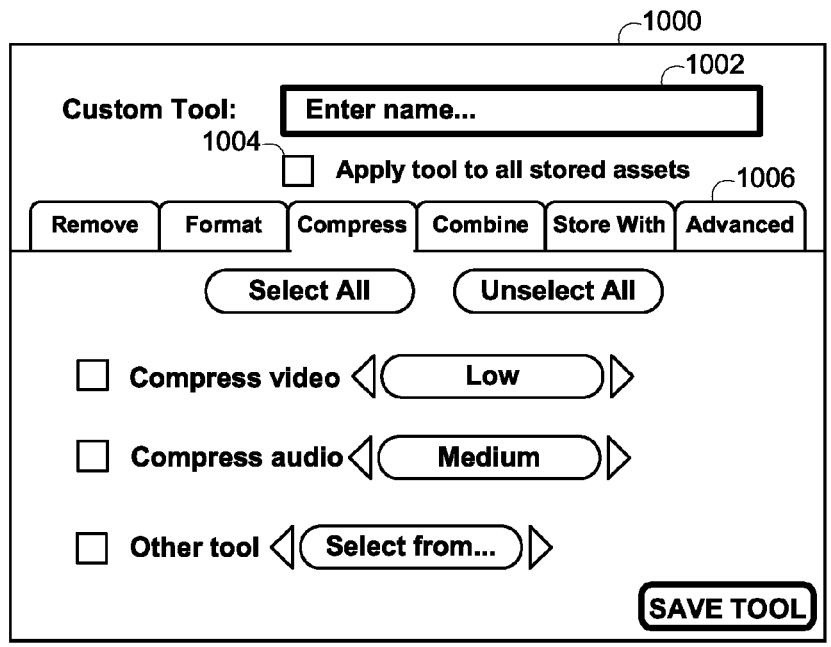
FIGS. 10A-10C depict illustrative custom tool configuration display screens.
Figure 10B:
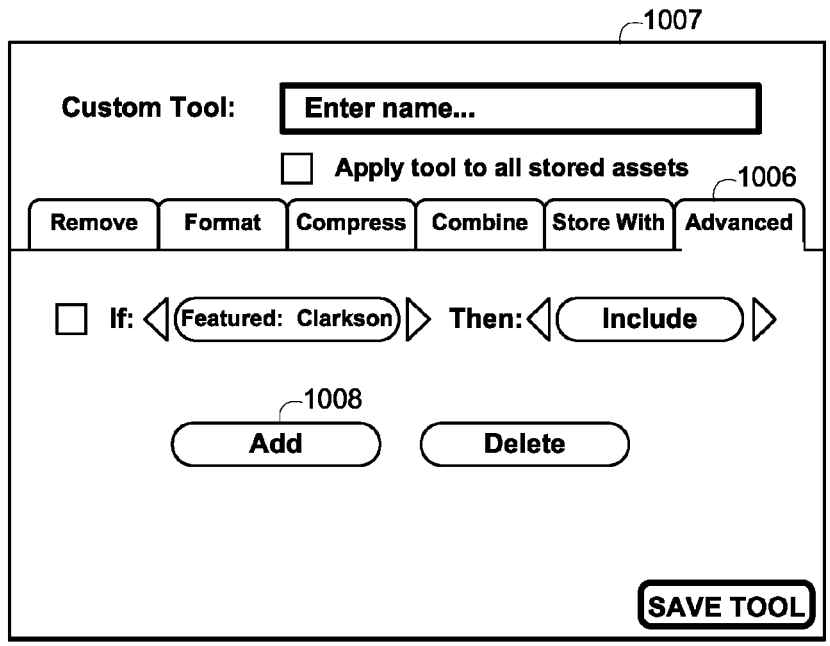
Figure 10C:
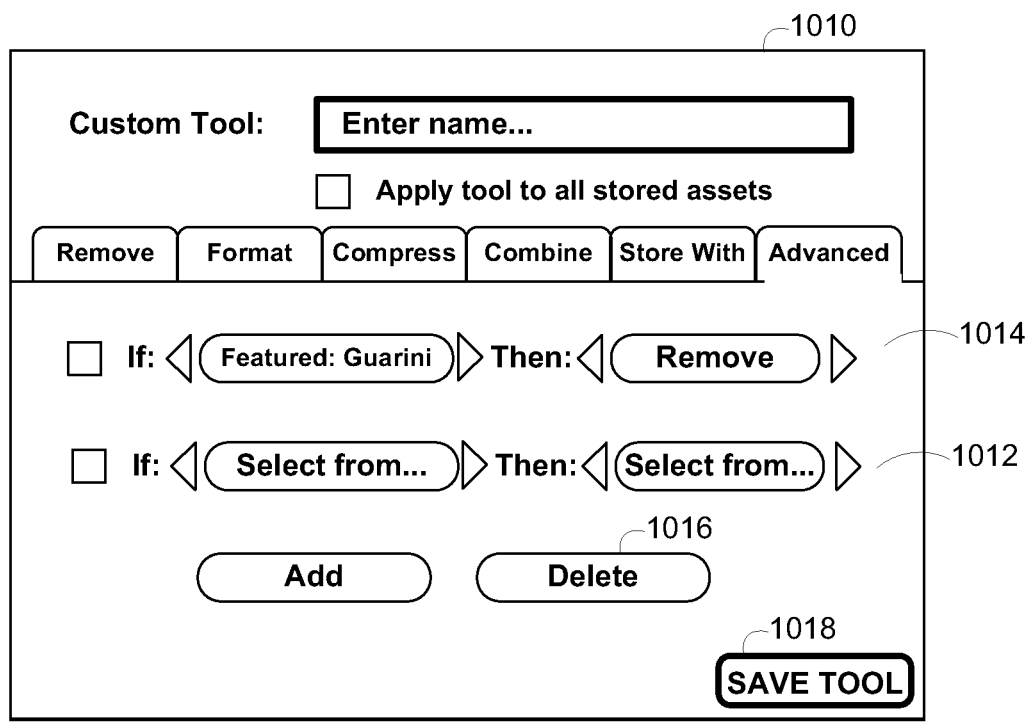

FIGS. 10A-10C depict illustrative custom tool configuration display screens in accordance with an embodiment of the invention. As discussed above with reference to editing tool engine 512 of FIG. 5, editing tools may be created by a user and stored as part of stored editing tools 532. An editing tool may be created by a user directly by providing a sequence of commands in an editing tool language interpretable by editing tool engine 512 (e.g., using a customized library of C programming language commands with editing tool engine 512 that contains a C compiler). In an embodiment, an editing tool may be encoded in the ETV Binary Interchange Format (EBIF) widget capable of being interpreted by interpreted by a user agent, for example, running on control circuitry 304 of FIG. 3. In an embodiment, an editing tool may be encoded as a series of JAVA-based files that are received and run by a local virtual machine or other suitable middleware executed by control circuitry 304. Alternately, a user may create an editing tool through a graphical interface consisting of display screens such as those illustrated in FIGS. 10A-10C. In an embodiment, both an editing tool language and a graphical interface may be available to a user to define a new editing tool.

The custom tool configuration display screens of FIGS. 10A-10C appear similar in organization to the editing tool display screens of FIGS. 7A-7E. Congruence between these two features of a media editing system may make such a system easier to use, and decrease the time required for users to become adept with different features. The following description of the custom tool configuration display screens of FIGS. 10A-10C details the distinct features of these display screens as compared to the editing tool display screens illustrated in FIGS. 7A-7E.

One feature illustrated in FIGS. 10A-10C is providing the user with the option to name a new custom editing tool (e.g., by entering the desired name in name field 1002 of display screen 1000). These names may be used to identify the custom editing tool in an "Other tools" option such as that selectable by box 716 of FIG. 7A, or button 940 of FIG. 9A). A second feature in an embodiment is providing the user with the choice of applying the custom editing tool to all stored media as a default editing tool. Such a choice is made, for example, by a user selecting box 1004 in display screen 1000.

FIG. 10A depicts an editing tool tab 1006 labeled "Advanced" and FIG. 10B illustrates display screen 1007 in which editing tool tab 1006 is the selected editing tool tab. In an embodiment, a user is able to "build" an editing tool by supplying at least one "if-then" statement that defines an editing tool to be applied if a certain condition is met. In an embodiment, the condition may relate to the selected asset. For example, the condition may relate to the assets already stored (e.g., as determined by ASE 504 querying stored assets database 510). A user may choose to add another "if-then" statement to the custom tool by, for example, selecting "Add" button 1008. Adding a new "if-then" statement may then cause display screen 1007 to display another customizable "if-then" outline, as depicted by additional outline 1012 in display screen 1010 of FIG. 10C.

FIG. 10C depicts an example of an appropriate "if-then" statement 1014. In the custom tool being configured in display screen 1010, if Justin Guarini is the featured participant in a program segment, then that segment will be removed in the stored edited asset when the custom rule is applied. Note that applying this custom rule to the selected asset "American Idol—Episode 3" (as in the scenario illustrated in FIG. 9B) would result in the same stored edited asset as would be achieved by the user selecting "Done" box 948 in display screen 902 of FIG. 9B. An embodiment of the invention includes both custom editing tool configuration (e.g., as illustrated in FIGS. 10A-10C) and segment identification and editing (e.g., as illustrated in FIGS. 9A-9B). Such embodiments may provide users with different levels of nonlinear editing capabilities in an easy-to-use and consistent format.

The "if" conditions available to a user will depend on the information available to ASE 504 from media information sources 508. Additionally, media information sources 508 will provide the information to ASE 504 to determine whether an "if" condition is true for particular selected assets. A user may decide to delete an "If-then" statement from the custom tool, for example, by selecting the appropriate box in the display screen, then selecting "Delete" button 1016 or pressing an appropriate key on a user input device. The user may save the custom tool (e.g., by selecting "Save Tool" button 1018 of display screen 1010 or pressing an appropriate key on a user input device).

Figure 11A:
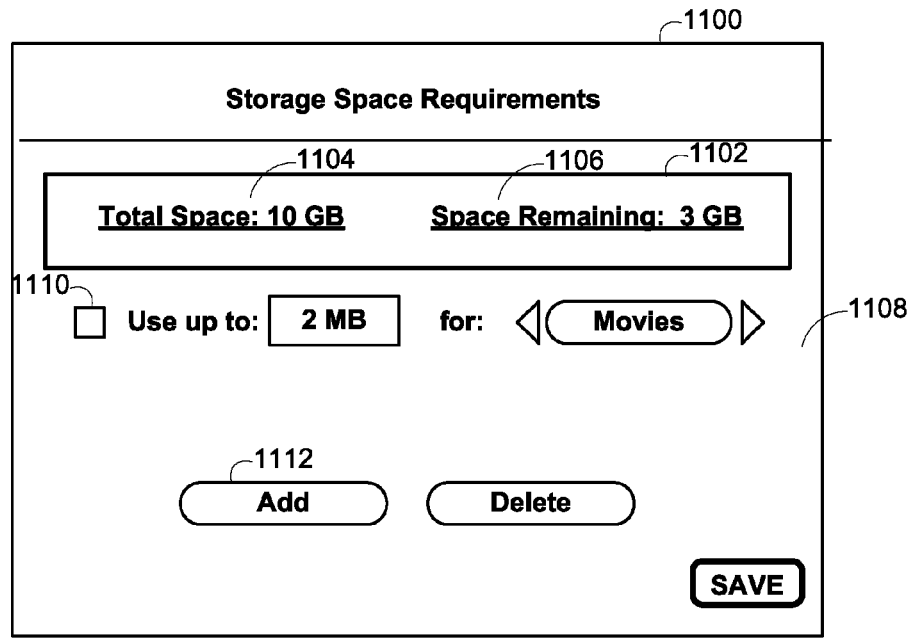
FIGS. 11A-11B depict illustrative storage space requirements display screens.
Figure 11B:
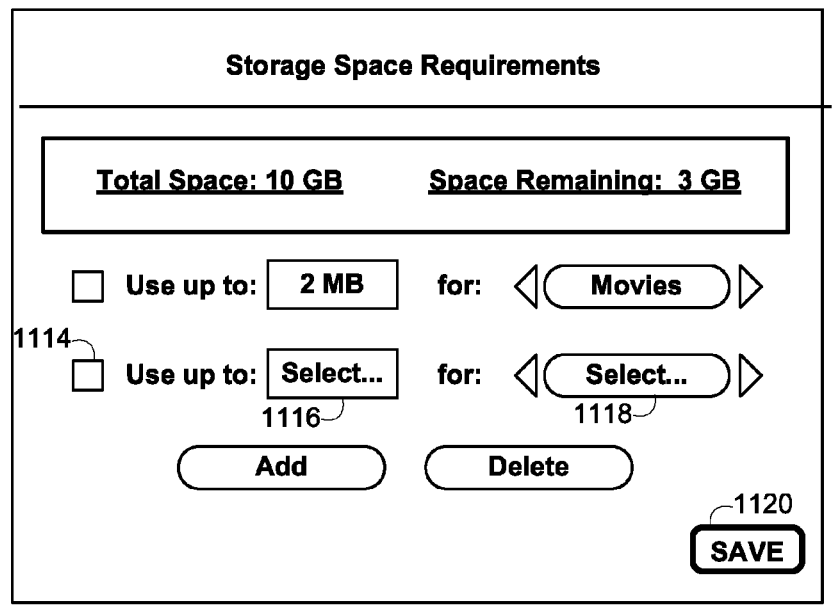

FIGS. 11A-11B depict illustrative storage space requirements display screens in accordance with an embodiment of the invention. As discussed above with reference to preferences and requirements 514 maintained in storage allocation engine 506 of FIG. 5, in an embodiment, a user is able to specify and customize a set of storage space requirements that impose constraints on the type, quantity and content of stored assets. In storage space requirements display screen 1100 of FIG. 11A, two storage statistics are displayed in storage statistics display region 1102: total storage space available for stored assets 1104 and storage space remaining for new assets 1106 (i.e., the amount of available storage space not currently used by stored assets or already allocated for future stored assets). Storage statistics display region 1102 may display any number of storage statistics including the percentage of storage used, storage use by media type or genre, or historical storage use in graph form, for example. The statistics display in storage statistics display region 1102 may be customized by the user.

In storage space constraints region 1108, a set of storage space requirements are listed. In FIG. 11A, one such constraint 1110 is displayed: the requirement that a maximum of 2 MB of storage space be used for media classed as a "movie." A user may add new storage space constraints by selecting "Add" button 1112 or by pressing an appropriate key on a user input device. An illustration of a result of choosing to add a new constraint is given by FIG. 11B, in which the user may specify the parameters of newly added constraint 1114. Newly added constraint 1114 may allow a user to provide both memory constraint 1116 and constraint condition 1118. The memory constraint may be expressed in any suitable form, for example, as an amount of the memory (e.g., "2 MB"), a percentage of total memory, a percentage of remaining/available memory, a memory location constraint when multiple storage locations are available (e.g., "Hard Drive 1" when assets can be stored to both "Hard Drive 1" and "PDA Memory").

The constraint criteria specify to which media the memory constraint should be applied once stored. Constraint criteria may include type, genre, date stored, or any of the other media or asset information described herein. As discussed above, in an embodiment, constraint conditions are supplied by user equipment, by the media delivery system, or by a remote storage provider. In an embodiment, constraint condition options may be presented to the user based on the type of equipment onto which assets are to be stored (e.g., different constraint conditions for storing ring tones in a cell phone than for audio files on a portable music device). Once a user has completed configuring the desired storage space requirements, he or she may select "Save" button 1120 to store the configured requirements for access by storage allocation engine 506.

Figure 12:
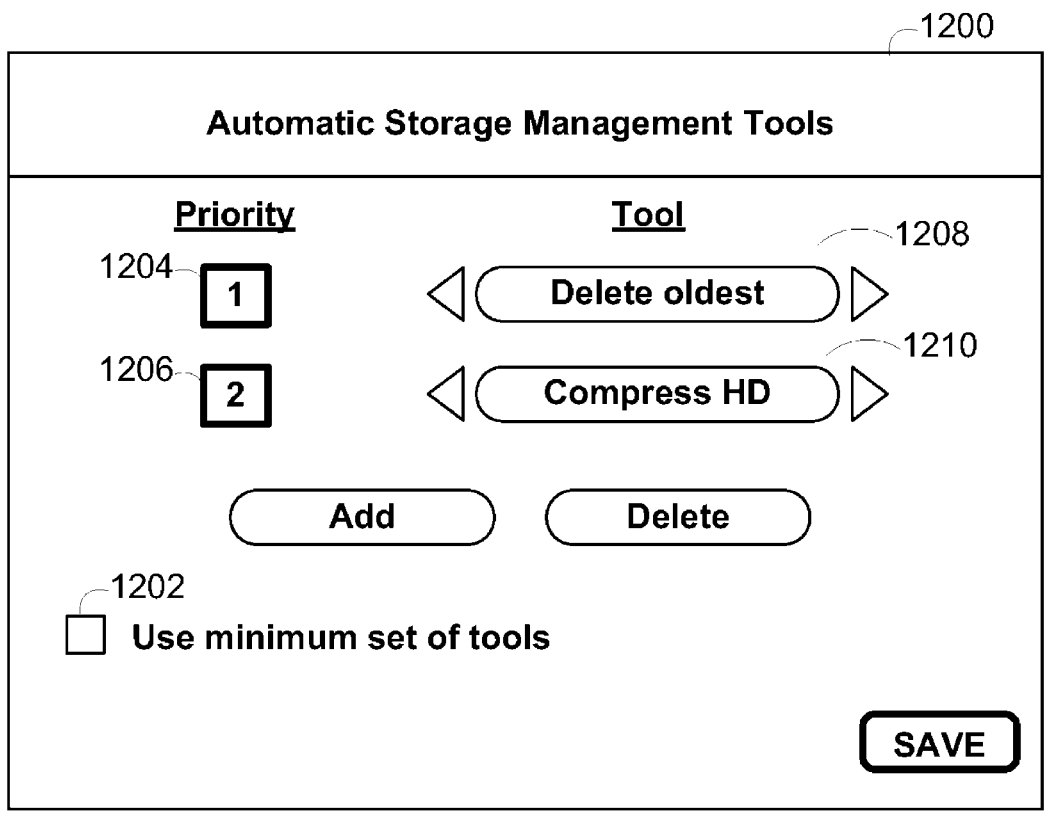
FIG. 12 depicts an illustrative automatic storage management tools display screen.

FIG. 12 depicts illustrative automatic storage management tools display screen 1200 in accordance with an embodiment of the invention. In an embodiment, a set of storage management tools may be automatically applied to stored assets and/or assets scheduled to be stored in order to satisfy storage space requirements (e.g., those as described above with reference to preferences and requirements 514 (FIG. 5) of storage allocation engine 506 (FIG. 5) and the illustrative display screens of FIGS. 11A-11B). Such embodiments may allow a user to select and customize a set of editing tools (e.g., as described above with reference to FIGS. 7A-7E), and/or storage space constraints (e.g., as described above with reference to FIGS. 11A-11B), or a combination of the two. Such automatic storage management tools may be automatically applied when storing an asset, either in its original form or in accordance with an editing template, would violate a storage space requirement. In these cases, asset storage engine 504 may automatically apply these tools prior to storage. An embodiment of this process is described in detail below with reference to FIG. 15. In an embodiment, the automatic storage management tools may be applied to the stored assets according to a schedule (e.g., once a week) and/or each time a new asset is stored.

In an embodiment, the automatic storage management tools may be prioritized (e.g., by a user, media storage provider or storage device). When a storage space requirement will be violated by the storage of a new asset, the automatic storage management tools will be applied to the stored assets in accordance with their priority until storing the new asset will no longer violate a storage space requirement. In display screen 1200, priorities 1204 and 1206 of the automatic storage management tools 1208 and 1210, respectively, are indicated by numbers which may correspond to a rank ordering. In an embodiment, the priority of an automatic storage management tool may be specified by a selection from a small set of choices (e.g., the three choices "low priority," "medium priority," and "high priority") or a more continuous scale (e.g., positioning a slider bar to indicate a priority of an automatic storage management tool between positions corresponding to "unimportant" and "very important"). In an embodiment, priority may be specified by a more complex set of criteria, as may be represented by a decision tree.

In some scenarios, a user may prefer that the stored assets undergo the minimal amount of editing required so that the new asset can be stored without violating the storage space requirements. In an embodiment, the user may request that the minimum set of tools be used (for example, by selecting box 1202 of the automatic storage management tools display screen 1200). ASE 504 may determine this minimum set by applying an editing metric that quantifies the amount of transformation the stored assets would undergo when each of the tools is applied (e.g., the change in memory usage of the stored assets after editing, the change in total duration of the stored assets after editing), then performing an optimization routine to select the fewest number of automatic storage management tools that, when applied, will allow the new asset to be stored without violating any storage space requirements.

Figure 13:
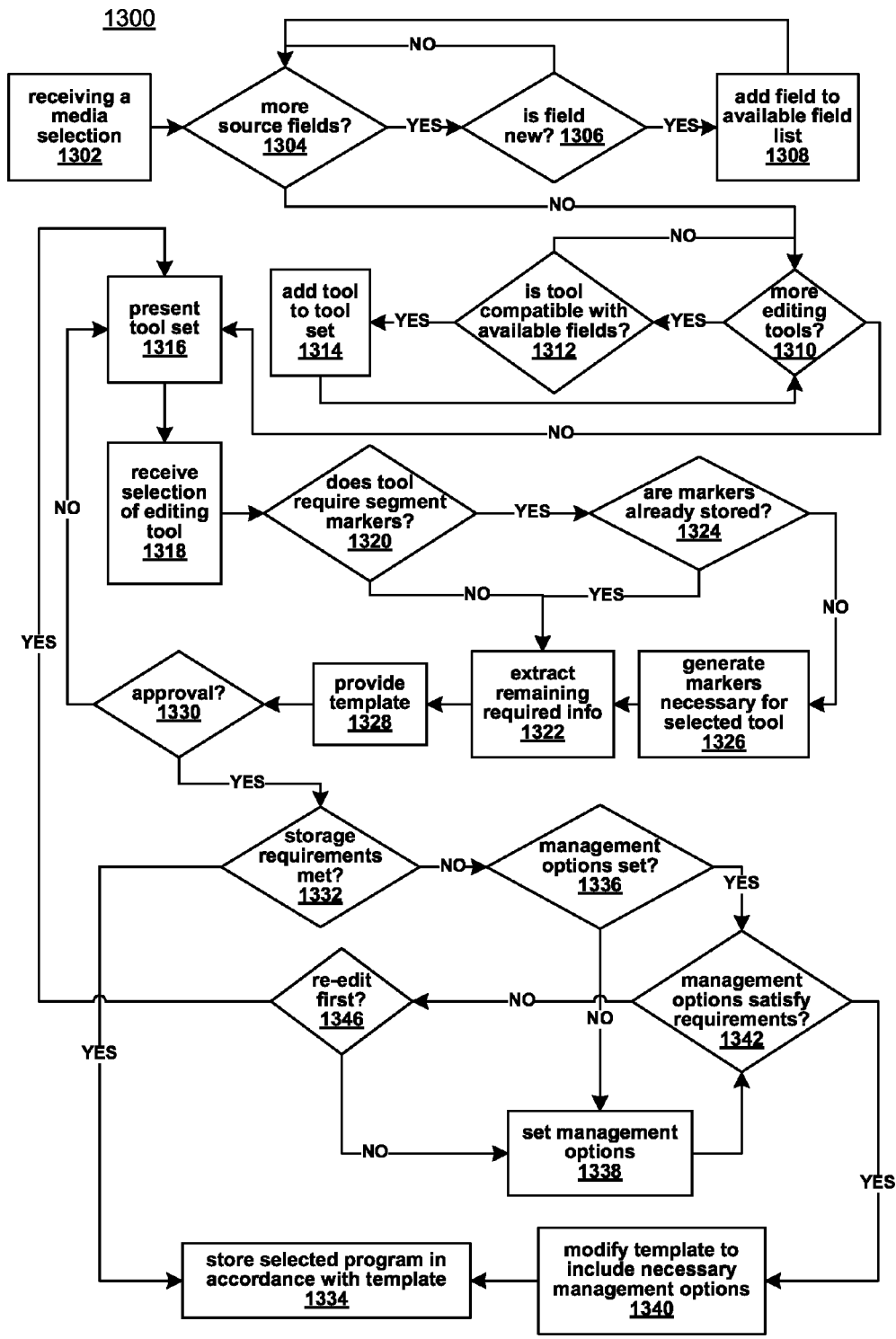
FIGS. 13-15 are flow diagrams of media editing and storage management processes in accordance with embodiments of the invention.

FIG. 13 is a flow diagram of media editing and storage management process 1300 in accordance with an embodiment of the invention. The processes 1300, 1400 and 1500 of FIGS. 13, 14 and 15, respectively, may be carried out by ASE 504, which may run on processing circuitry 306 of user equipment 300 (FIG. 3) or on processing equipment located remotely at a media or Internet provider.

At step 1302 of process 1300, a selection of media to be recorded is received. Selected media could be any of the media items described herein, and may be provided by a media provider, an Internet provider, or any other media source such as media content source 416 of FIG. 4. As illustrated in FIG. 5, such a selection may serve as media storage request 502.

Once a media selection is received at step 1302, process 1300 may proceed to step 1304, which begins the assembly of a list of the available information fields for the selected media. The available information fields are the types of media information available for the selected program. For example, if the selected program is an episode of the television series "Law and Order," available information fields for this program may include "title," "length," "episode number," and "featured actors." As described above with reference to FIG. 5, the information that populates the available information fields may come from any of media information sources 508 (FIG. 5), such as media content source 416 or media guidance data source 418 of FIG. 4.

At step 1304, process 1300 begins a scan of media information sources 508. Specifically, at step 1304, process 1300 determines whether there are any unscanned fields in media information sources 508 to be considered for inclusion in the list. At the start of the scan (i.e., when process 1300 proceeds from step 1302 to step 1304), the list of available information fields is empty, and none of media information sources 508 have been scanned. Each of media information sources 508 may be scanned sequentially, by considering each of the different media information sources 508 one at a time. For example, at step 1304, the program information provided by EPG 522 may be examined. If there is an information field remaining to be scanned, the process 1300 moves to step 1306 and determines whether the field is already included in the list. Continuing with the above example of scanning EPG 522, each one of the available information fields in EPG 522 may be compared to the pending list of available information fields to determine whether the one available information field in the EPG is already contained in the pending list. If the information field has not been included in the list, the field is added to the list in step 1308, at which point process 1300 returns to step 1304 to consider whether addition information fields are available.

At step 1306, if a field is already included in the list, it is not included a second time and process 1300 returns to step 1304. In an embodiment, the availability of an information field from more than one media information source may be recorded by ASE 504 to be used to validate the information associated with that information field (e.g., to correct errors). In an embodiment, ASE 504 stores a pre-assembled list of available information fields, and process 1300 does not perform the scanning and checking steps 1304 and 1306. Such an embodiment may advantageously reduce the time required to execute the process of FIG. 13 in media delivery systems in which the same information fields are available for all selectable media items. In an embodiment, process 1300 is executed by ASE 504 on user equipment 300 (FIG. 3) and the list of available information fields is stored in storage 308 (FIG. 3).

Once the list of available information fields has been assembled by proceeding through steps 1304-1308 until media information sources 508 have been scanned, process 1300 may next proceed to step 1310 and begin to assemble a set of editing tools that could be applied to the selected media. As discussed above (e.g., with reference to FIG. 7A), different editing tools may require different types of information about the selected media. For example, an editing tool that replaces video commercials with a still image advertisement will require knowledge of the start and end points of the commercials to be replaced, as well as still image data files to use to replace the video commercials in the stored edited asset (as described above with reference to FIG. 7B). If such information is not available from any of media information sources 508, the editing tool may not be successfully applied. Thus, in a manner analogous to the assembly of the available information fields list described with reference to steps 1304-1308, in steps 1310-1314, an editing tool set may be constructed in which each editing tool is compatible with the available information for the selected media. Process 1300 may include querying any of a number of editing tool sources when assembling the editing tool set, as described above with reference to editing tool engine 512 of FIG. 5.

Specifically, at step 1310, process 1300 determines whether there are additional editing tools to consider from any additional sources in the construction of the editing tool set. If such an editing tool exists, the information requirements of that tool are compared against the available information fields list for the selected media (step 1312). If the information requirements of the editing tool are compatible with the available information fields list, the editing tool is added to the editing tool set at step 1314. If the editing tool is not compatible with the available information fields list (e.g., the editing tool requires unavailable content information), process 1300 returns to step 1310 to consider additional editing tools.

Once all editing tools have been considered, the editing tool set is complete and is presented to the user at step 1316. At step 1318, the user may select and customize the editing tools to be applied to the selected media (as described above with reference to FIGS. 7A-7E and 10A-10C). In an embodiment, the tool set is not presented to a user at step 1316. Instead, the step 1316 is omitted and the step 1318 is performed automatically, without a user's direct intervention. The automatic selection of an editing tool may be performed by ASE 504, for example, in accordance with at least one of automatic storage management tools 515 of FIG. 5 (as discussed above with reference to FIG. 12). In an embodiment, a user may customize the editing tools via user input interface 310 (FIG. 3).

Once a selection of an editing tool is received at step 1318, process 1300 proceeds to step 1320 to begin to extract the media information associated with the information fields required by the selected editing tool. This extraction takes place in steps 1320-1328. In an embodiment, this information extraction process is performed substantially concurrently with the process of assembling the available information fields list (steps 1304-1308), or immediately following the assembly of the list. Such embodiments may be advantageous in that they only require a single period of information retrieval from media information sources 508. However, such embodiments may result in the accumulation of media information that is irrelevant to the selected editing tool, adding both unnecessary computation time and memory resources.

Steps 1320-1328 describe in detail an information extraction procedure that may be followed to address the potential requirement by the selected editing tools for segment markers. It will be understood that any media information feature may be addressed with a substantially similar procedure (in addition to, or instead of segment markers).

At step 1320, the information requirements of the selected editing tool are considered to determine whether segment markers (as discussed above, for example, with reference to FIGS. 9A-9B) are required by the selected editing tool. If segment markers are not required by the selected editing tool, process 1300 proceeds to step 1322 and extracts the remaining required information corresponding to the required fields from media information sources 508.

If segment markers are required by the selected editing tool, process 1300 proceeds to step 1324 to determine whether such segment markers have already been stored (for example, in EPG 522, local storage 528 or remote storage 530) or will be provided (for example, by media content source 416 or media guidance data source 418 of FIG. 4, or real-time/streaming information source 520 or content analysis engine 518 of FIG. 5). If the segment markers are already stored or will be provided, process 1300 moves to step 1322 and the remaining required information (including the segment markers) are extracted. If the segment markers will be provided by real-time/streaming information source 520, process 1300 may not perform step 1322 until the segment marker information is received. If segment markers are not already stored, process 1300 may proceed to step 1326 and invoke content analysis engine 518 of FIG. 5, which may generate the required segment markers. Process 1300 may then proceed to step 1322 to extract the remaining required information for the selected editing tool.

Once all required information has been extracted, process 1300 proceeds to step 1328 and provides asset storage template 536. The asset storage template contains storage instructions for the selected media in accordance with the selected editing tools (as discussed above with reference to asset storage template 536 of FIG. 5). Optionally, process 1300 proceeds from step 1328 to step 1330 and user approval of asset storage template 536 is requested. Step 1330 may be accompanied by a preview or summary of the edited asset (i.e., the asset that will be created when the selected media is stored in accordance with asset storage template 536). In an embodiment, approval is requested, and/or the preview or summary is displayed, by display 312 of user equipment 300 (FIG. 3). As noted with reference to step 1318, approval may be requested at step 1330 without requiring user intervention. This step may be performed by comparing the edited asset against some set of criteria (e.g., criteria that specify that edited television programs of a certain genre be no more than a certain duration, or that edited audio assets have a dynamic range falling within certain bounds). If approval of the edited asset is not received, process 1300 may return to step 1316 and present the set of editing tools. If approval of the edited asset is received, process 1300 moves on to step 1332 to begin to address the edited asset's satisfaction of the storage requirements.

At step 1332, it is determined whether the edited asset meets the existing storage requirements. In an embodiment, these storage requirements have been configured by the user in the manner described above with reference to FIGS. 11A-11B. The storage requirements may be imposed by a media delivery provider, a media storage provider, local storage equipment, or any combination of any of these sources. If the edited asset will satisfy all of the storage requirements when stored, process 1300 may proceed to step 1334 and store the selected media in accordance with the asset storage template 536.

If, at step 1332, it is determined that one or more of the storage requirements would be violated by the edited asset when stored, process 1300 proceeds to step 1336 and determines whether any storage management options have been configured or set. In an embodiment, storage management options are configured by the user (for example, in the manner described above with reference to FIG. 12). Such management options may be configured by a remote storage provider or set for a local storage device such as storage 308 (FIG. 3). If, at step 1336, it is determined that storage management options have been configured or set (for example, by querying preferences and requirements 514 of storage allocation engine 506), process 1300 may proceed to step 1342 and determine if applying the management options will satisfy the storage requirements. For example, FIG. 12 depicts an embodiment in which two storage management tools have been specified: a first tool that deletes the oldest stored assets when additional storage space is required, and a second tool that provides instructions to compress the selected media if it is in HD prior to storage. As discussed above with reference to FIG. 12, in an embodiment, ASE 504 may determine whether application of a combination of the first and second tools will satisfy the storage requirements.

However, at step 1336, if it is determined that no management options have been set, process 1300 proceeds to step 1338 to configure storage management options before proceeding to step 1342 to determine if applying the management options will satisfy the storage requirements. If applying the management options will satisfy the requirements, process 1300 may proceed to step 1340 to modify asset storage template 536 in accordance with the storage management options.

However, at step 1342, if it is determined that the storage requirements are not satisfied, process 1300 may proceed to step 1346 to prompt the user to adjust at least one of the management options and/or the selection and customization of the editing tool set ("re-edit"). If the user chooses to "re-edit" at step 1346, process 1300 returns to step 1316 and presents the editing tool set to the user. In an embodiment, the editing tool set is presented to the user in the most recent configuration when process 1300 returns to step 1316. In an embodiment, all or some of the previous user customizations of the editing tool set are reset to default values. If the user chooses to reconsider the management options at step 1346, process 1300 proceeds to step 1338 to adjust the management options. In an embodiment, the user may reconsider the editing tools and the management options substantially concurrently, or be provided the opportunity to consider both before another check on the storage requirements is performed (e.g., at step 1332).

Once it is determined at step 1342 that the storage requirements are satisfied, process 1300 proceeds to step 1334 and stores the selected media in accordance with asset storage template 536. In an embodiment, the selected media is stored on storage 308 of user equipment 300 (FIG. 3).

Figure 14:
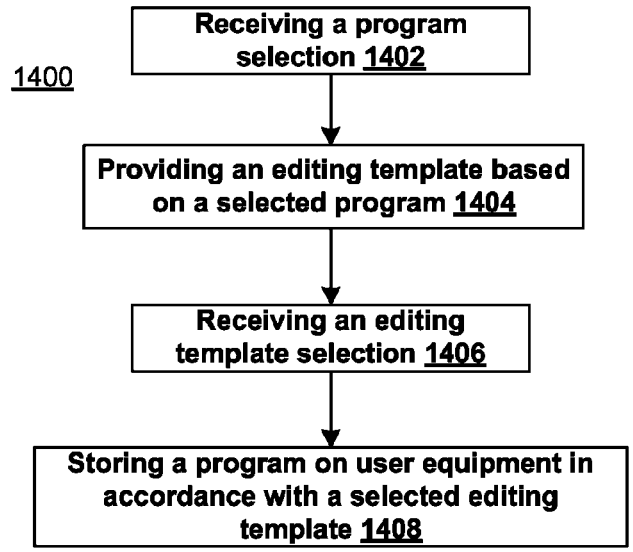

FIG. 14 is a flow diagram of process 1400 for managing storage space of programs stored on a storage device in accordance with an embodiment of the invention.

At step 1402, a selection of at least one program is received (e.g., media storage request 502 at ASE 504 of FIG. 5).

Process 1400 next proceeds to step 1404, in which at least one editing template is provided based on the at least one program selected in step 1402 (e.g., ASE 504 provides asset storage template 536 of FIG. 5). In an embodiment, the editing template is provided at step 1404 based on at least one of: the content of the at least one program; metadata associated with the at least one program; stored user preferences based on the content of the at least one program (e.g., as stored in storage allocation engine 506 and provided by media information sources 508 of FIG. 5). In an embodiment, step 1404 is based on assets already stored on the storage device (e.g., in stored assets database 510 of FIG. 5 and/or storage 308 of FIG. 3). In an embodiment, the editing template provided in step 1404 is created by a user (e.g., as discussed with reference to FIGS. 9A-9B).

Next, at step 1406, a selection of at least one editing template (provided in step 1404) is received (e.g., the user approval of step 1330 of FIG. 13, and/or via user input interface 310 of FIG. 3).

Process 1400 moves from step 1406 to step 1408 and stores the at least one program (selected in step 1402) on the user equipment in accordance with the at least one editing template selected in step 1404. In an embodiment, ASE 504 may perform step 1408 as described with reference to step 1334 of FIG. 13. In an embodiment, step 1408 includes at least one of: compressing a portion of the at least one program and removing a portion of the at least one program. In an embodiment, a removed portion may be at least one of a commercial, an opening sequence, a closing sequence, a preview sequence, a repeated sequence and a recap sequence. In an embodiment, a removed portion is the same as a portion of a stored asset. Examples of each of these elements are described in detail with reference to FIGS. 7A-7E.

In an embodiment, step 1408 includes storing a first and a second program as corresponding portions of a stored asset. The first and second programs may be sequential parts of a media event, and/or a visual transition may be generated between the first and second portions within the stored asset (e.g., as described with reference to FIG. 7E).

Optional steps that may be included in process 1400 include: accessing the at least one program from a storage space (e.g., storage 308 of FIG. 3), accessing the at least one program from a remote source (e.g., media content source 416 of FIG. 4), accessing the at least one program from a storage buffer, and/or receiving the at least one editing template from a remote source (e.g., stored editing tools 532 of FIG. 5).

Process 1400 may include the steps of: checking an amount of storage space available in the storage device; comparing the amount of storage space available to a storage space requirement; and providing the at least one editing template based on the comparison between the amount of storage space available and the storage space requirement (e.g., as discussed above with reference to storage space requirements and automatic storage management tools of FIGS. 11A-11B and 12).

Process 1400 may include the steps of: determining a content characteristic of the at least one program; and providing the at least one editing template based on the determined content characteristic (e.g., as described above with reference to FIGS. 7A-7E and 9A-9B). The content characteristic may be a television series to which the at least program belongs and/or a featured participant in the at least one program. In an embodiment, step 1408 includes storing a portion of the at least one program which includes a featured participant (e.g., "including" segments featuring Kelly Clarkson as depicted in FIG. 10B).

Figure 15:
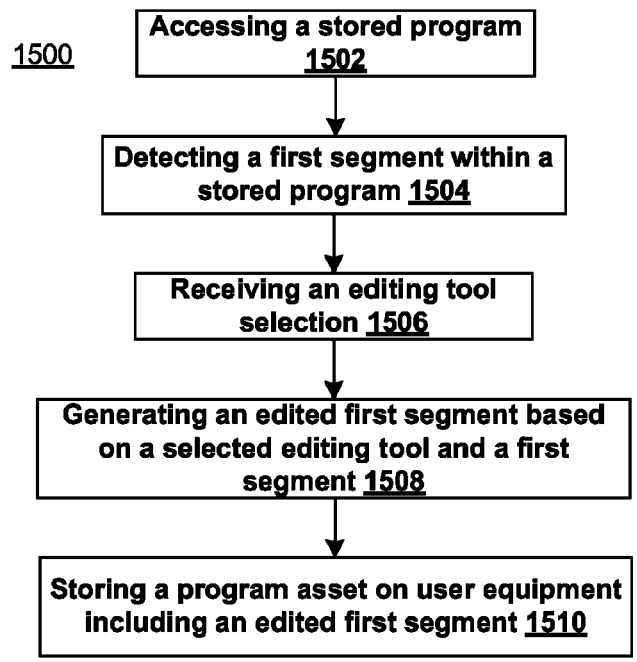

FIG. 15 is a flow diagram of process 1500 for managing storage space of programs stored on a storage device in accordance with an embodiment of the invention.

At step 1502, at least one stored program from a storage space is accessed (e.g., from stored assets database 510 of FIG. 5 and/or storage 308 of FIG. 3).

Process 1500 next proceeds to step 1504 to detect a first segment within the at least one stored program (e.g., by invoking content analysis engine 518 or any of media information sources 508 of FIG. 5). In an embodiment, step 1504 includes applying a set of segment markers to the at least one stored program (e.g., as discussed above with reference to FIGS. 9A-9B). In an embodiment, process 1500 includes a step of receiving the set of segment markers from a remote source. The set of segment markers may include segment time markers and segment content identifiers.

From step 1504, process 1500 proceeds to step 1506 to receive a selection of an editing tool (e.g., as discussed above with reference to FIGS. 7A-7E). In an embodiment, step 1506 includes receiving a selection of a first editing option and receiving a selection of a second editing option (e.g., selecting more than one of the editing tools displayed in the display screens of FIGS. 7A-7E, which may be presented via display 312 of FIG. 3).

Next, process 1500 moves to step 1508, where an edited first segment is generated based on the editing tool selected in step 1506 and the first segment detected in step 1504, wherein the edited first segment is a transformation of the first segment (e.g., replacing a portion of a selected media asset with a reduced memory portion as described above with reference to FIG. 7B). The transformation may be based on a comparison of segment content identifiers with a set of user content preferences (e.g., the featured participants of the segments of the selected media asset of FIG. 9B). In an embodiment, the transformation is at least one of: a compression; a change in video standard; removing a portion of the first segment (which may include at least one of a commercial, an opening sequence, a closing sequence, a preview sequence, a repeated sequence and a recap sequence); replacing a first portion of the first segment with a second portion, wherein the second portion requires a smaller amount of storage space than the first portion (the reduced memory portion may include at least one of a static image, a text message, a low-resolution segment, an abbreviated segment, and a compressed segment). Examples of embodiments including each of these features are discussed above with reference to FIGS. 7A-7E. The transformation may be based on a set of user preferences, which may include at least one of content preferences and display preferences, or may be based on a set of previously stored assets (e.g., the assets and preferences stored in preferences and requirements 514 and stored assets database 510, respectively).

From step 1508, process 1500 proceeds to step 1510 and a program asset is stored that includes the edited first segment on the storage device (e.g., storage 308 of FIG. 3). In an embodiment, the edited first segment is stored with a previously stored program asset (e.g., as discussed above with reference to FIG. 7D). In an embodiment, the stored program asset replaces the at least one stored program in memory.

In an embodiment, process 1500 includes at least one of the following additional steps: generating a set of segment markers based on the content of the at least one stored program (which may be based on a set of user content preferences or specified by a user) (e.g., by invoking the content analysis engine 518 of FIG. 5).

In an embodiment, process 1500 includes the step of detecting a second segment within the at least one stored program. In these embodiments, the first and second segments may be sequential parts of a media event, the program asset may include the second segment, and/or a visual transition between the edited first segment and the second segment (e.g., as discussed above with reference to FIG. 7E).

In an embodiment, process 1500 includes the step of generating an edited second segment based on the selected editing tool and the second segment, wherein the edited second segment is a second transformation of the second segment, and the program asset comprises the edited second segment. The editing tool may generate the edited second segment based at least in part on the content of the first segment, and the first transformation may be based at least in part on a comparison of the content of the first and second segments (e.g., as discussed above with reference to FIG. 7A). In an embodiment, process 1500 includes the step of saving the selected editing tool (e.g., with stored editing tools 532 of FIG. 5).

It is to be understood that while certain forms of the present invention have been illustrated and described herein, it is not to be limited to the specific forms or arrangement of parts described and shown. Those skilled in the art will know or be able to ascertain using no more than routine experimentation, many equivalents to the embodiments and practices described herein. Accordingly, it will be understood that the invention is not to be limited to the embodiments disclosed herein.

What is claimed is:

1. A method for managing storage space of programs stored on a storage device, the method comprising:

receiving a selection of at least one program;

comparing an amount of storage space available in the storage device to a storage space requirement;

in response to determining that the amount of storage space does not satisfy the storage space requirement, determining at least one editing template based on the at least one program;

receiving a selection of at least one editing template;
storing the at least one program on the storage device in accordance with the selected at least one editing template.

2. The method of claim 1, wherein storing the at least one program on the storage device comprises compressing a portion of the at least one program.

3. The method of claim 1, wherein storing the at least one program on the storage device comprises removing a portion of the at least one program.

4. The method of claim 3, wherein the removed portion comprises at least one of a commercial, an opening sequence, a closing sequence, a preview sequence, a repeated sequence and a recap sequence.

5. The method of claim 1, wherein storing the at least one program on the storage device comprises storing a first and a second program as corresponding portions of a stored asset.

6. The method of claim 5, wherein the first and second programs are sequential parts of a media event.

7. The method of claim 5, wherein storing the at least one program on the storage device in accordance with the editing template comprises generating a visual transition between the first and second portions within the stored asset.

8. The method of claim 1, further comprising determining the editing template based on the content of the at least one program.

9. The method of claim 1, further comprising determining the editing template based on metadata associated with the at least one program.

10. The method of claim 1, further comprising determining the editing template based on assets stored on the storage device.

11. The method of claim 10, wherein storing the at least one program segment on the storage device in accordance with the editing template comprises removing a portion of the at least one program, wherein the removed portion is the same as a portion of a stored asset.

12. The method of claim 1, further comprising determining the editing template based on stored user preferences, wherein the user preferences are based on the content of the at least one program.

13. The method of claim 1, further comprising accessing the at least one program from a storage space.

14. The method of claim 1, further comprising accessing the at least one program from a remote source.

15. The method of claim 1, further comprising accessing the at least one program from a storage buffer.

16. The method of claim 1, further comprising receiving the at least one editing template from a remote source.

17. The method of claim 1, wherein the at least one editing template is created by a user.

18. The method of claim 1, wherein the storage device is a remote storage device.

19. The method of claim 1, wherein the storage device is a local storage device.

20. The method of claim 1, further comprising:
determining a content characteristic of the at least one program; and
determining the at least one editing template based on the determined content characteristic.

21. The method of claim 20, wherein the content characteristic is a television series to which the at least one program belongs.

22. The method of claim 20, wherein the content characteristic is a featured participant in the at least one program.

23. The method of claim 22, wherein storing the at least one program on the storage device comprises storing a portion of the at least one program which includes the featured participant.

24. The method of claim 1, wherein the storage space requirement comprises one of an amount of storage space and a percentage of storage space.

25. A system for managing storage space of programs stored on a storage device, the system comprising:
a user input configured to receive a selection;
a storage device configured to store at least one program; and
processing circuitry, communicably coupled to the user input and the storage device and configured to:
receive a selection of at least one program;
compare an amount of storage space available in the storage device to a storage space requirement;
in response to determining that the amount of storage space does not satisfy the storage space requirement, determine at least one editing template based on the at least one program;
receive a selection of at least one editing template; and
store the at least one program on the storage device in accordance with the selected at least one editing template.

26. The system of claim 25, wherein storing the at least one program on the storage device comprises compressing a portion of the at least one program.

27. The system of claim 25, wherein storing the at least one program on the storage device comprises removing a portion of the at least one program.

28. The system of claim 27, wherein the removed portion comprises at least one of a commercial, an opening sequence, a closing sequence, a preview sequence, a repeated sequence and a recap sequence.

29. The system of claim 25, wherein storing the at least one program on the storage device comprises storing a first and a second program as corresponding portions of a stored asset.

30. The system of claim 29, wherein the first and second programs are sequential parts of a media event.

31. The system of claim 29, wherein storing the at least one program on the storage device in accordance with the editing template comprises generating a visual transition between the first and second portions within the stored asset.

32. The system of claim 25, wherein the processing circuitry is further configured to determine the editing template based on the content of the at least one program.

33. The system of claim 25, wherein the processing circuitry is further configured to determine the editing template based on metadata associated with the at least one program.

34. The system of claim 25, wherein the processing circuitry is further configured to determine the editing template based on assets stored on the storage device.

35. The system of claim 34, wherein storing the at least one program segment on the storage device in accordance with the editing template comprises removing a portion of the at least one program, wherein the removed portion is the same as a portion of a stored asset.

36. The system of claim 25, wherein the processing circuitry is further configured to determine the editing template based on stored user preferences, wherein the user preferences are based on the content of the at least one program.

37. The system of claim 25, wherein the processing circuitry is further configured to access the at least one program from a storage space.

38. The system of claim 25, wherein the processing circuitry is further configured to access the at least one program from a remote source.

39. The system of claim 25, wherein the processing circuitry is further configured to access the at least one program from a storage buffer.

40. The system of claim 25, wherein the processing circuitry is further configured to receive the at least one editing template from a remote source.

41. The system of claim 25, wherein the at least one editing template is created by a user.

42. The system of claim 25, wherein the storage device is a remote storage device.

43. The system of claim 25, wherein the storage device is a local storage device.

44. The system of claim 25, wherein the processing circuitry is further configured to:

determine a content characteristic of the at least one program; and determine the at least one editing template based on the determined content characteristic.

45. The system of claim 44, wherein the content characteristic is a television series to which the at least one program belongs.

46. The system of claim 45, wherein storing the at least one program on the storage device comprises storing a portion of the at least one program which includes the featured participant.

47. The system of claim 44, wherein the content characteristic is a featured participant in the at least one program.

48. The system of claim 25, wherein the storage space requirement comprises one of an amount of storage space and a percentage of storage space.

* * * * *